(12) United States Patent
Sadai

(10) Patent No.: US 9,545,147 B2
(45) Date of Patent: Jan. 17, 2017

(54) PORTABLE ELECTRONIC TERMINAL HOLDING TOOL

(71) Applicant: Satoru Sadai, Higashiosaka (JP)

(72) Inventor: Satoru Sadai, Higashiosaka (JP)

( * ) Notice: Subject to any disclaimer, the term of this patent is extended or adjusted under 35 U.S.C. 154(b) by 0 days.

(21) Appl. No.: 14/649,811

(22) PCT Filed: Nov. 5, 2013

(86) PCT No.: PCT/JP2013/079828
§ 371 (c)(1),
(2) Date: Jun. 4, 2015

(87) PCT Pub. No.: WO2014/119077
PCT Pub. Date: Aug. 7, 2014

(65) Prior Publication Data
US 2015/0351525 A1    Dec. 10, 2015

(30) Foreign Application Priority Data

Feb. 1, 2013    (JP) .................................. 2013-018028

(51) Int. Cl.
*G06F 1/16*     (2006.01)
*A45F 5/00*     (2006.01)
(Continued)

(52) U.S. Cl.
CPC .............. *A45F 5/10* (2013.01); *G06F 1/1656* (2013.01); *H04B 1/3888* (2013.01); *H04M 1/04* (2013.01);
(Continued)

(58) Field of Classification Search
CPC ................ A45F 5/10; A45F 2200/0516; A45F 2200/0525; A45F 2200/0575; A45F 2005/008; H04M 1/0281; H04M 1/04; G06F 1/1656; H04B 1/3888; A45C 2011/002
See application file for complete search history.

(56) References Cited

U.S. PATENT DOCUMENTS 6,625,283 B1    9/2003    Sato
7,138,977 B2 *  11/2006   Kinerk .................. G06F 1/1626
                                                                345/156
(Continued)

FOREIGN PATENT DOCUMENTS

JP     H05-012957 U     2/1993
JP     2000-330690 A    11/2000
(Continued)

OTHER PUBLICATIONS

International Search Report for PCT/JP2013/079828, ISA/JP, mailed Feb. 4, 2014.

*Primary Examiner* — Dean Kramer
(74) *Attorney, Agent, or Firm* — Harness, Dickey & Pierce, P.L.C.

(57) ABSTRACT

The present invention of a portable electronic terminal holding tool allows ensuring the hold of a portable electronic terminal without dropping from a hand as well as enhancing input operability by the thumb of a holding hand through extending the reachable range of the thumb. This holding tool comprises a stick protruding in the direction of a side surface of a portable electronic terminal. The stick is placed on the interdigit between fingers, while the tips of fingers prop up the portable terminal from the back surface.

15 Claims, 24 Drawing Sheets

(51) Int. Cl.
*A45F 5/10* (2006.01)
*H04B 1/3888* (2015.01)
*H04M 1/04* (2006.01)
*A45C 11/00* (2006.01)

(52) U.S. Cl.
CPC .... *A45C 2011/002* (2013.01); *A45F 2005/008* (2013.01); *A45F 2200/0516* (2013.01); *A45F 2200/0525* (2013.01); *A45F 2200/0575* (2013.01)

(56) References Cited

U.S. PATENT DOCUMENTS

| | | | | |
|---|---|---|---|---|
| 7,425,948 | B2* | 9/2008 | Ling | G06F 1/1626 248/688 |
| 7,984,804 | B2* | 7/2011 | Lebauer | A45C 11/008 206/234 |
| 8,047,499 | B2* | 11/2011 | Yu | F16M 13/00 248/455 |
| 8,054,613 | B2* | 11/2011 | Hsu | F16M 13/00 345/179 |
| 8,405,981 | B2 | 3/2013 | Takemasa et al. | |
| 2002/0118175 | A1 | 8/2002 | Liebenow et al. | |
| 2004/0109285 | A1* | 6/2004 | Lee | G06F 1/1626 361/679.3 |
| 2004/0121798 | A1* | 6/2004 | Hamasaki | A45F 5/00 455/550.1 |
| 2007/0018948 | A1 | 1/2007 | Chen et al. | |
| 2009/0283559 | A1* | 11/2009 | Foggiato | A45F 5/00 224/217 |
| 2010/0296235 | A1 | 11/2010 | Takemasa et al. | |
| 2012/0075801 | A1* | 3/2012 | Yang | A63H 33/006 361/679.59 |
| 2012/0217852 | A1* | 8/2012 | Yu | A45F 5/00 312/223.1 |
| 2013/0053113 | A1* | 2/2013 | Linhardt | H04M 1/04 455/575.1 |
| 2013/0181098 | A1* | 7/2013 | Lin | F16M 11/105 248/122.1 |
| 2015/0011257 | A1* | 1/2015 | Hsu | H04M 1/0254 455/556.1 |

FOREIGN PATENT DOCUMENTS

| | | |
|---|---|---|
| JP | 3076806 U | 4/2001 |
| JP | 2002-152352 A | 5/2002 |
| JP | 2013-003707 A | 1/2013 |
| WO | WO-2007014041 A1 | 2/2007 |
| WO | WO-2009-101800 A1 | 8/2009 |

* cited by examiner

PORTABLE ELECTRONIC TERMINAL HOLDING TOOL

CROSS-REFERENCE TO RELATED APPLICATIONS

This application is a 371 U.S. National Stage of International Application No. PCT/JP2013/079828, filed Nov. 5, 2013, which claims the benefit of and priority to Japanese Patent Application No. 2013-018028, filed Feb. 1, 2013. The disclosures of the above applications are incorporated herein by reference.

FIELD OF THE INVENTION

The present invention relates to a holding tool and a holding method of enhancing operability through ensuring the hand-holding of a tablet-type portable electronic terminal having a touch panel.

DESCRIPTION OF THE RELATED ART

The tablet-type portable electronic terminal having a touch panel which is represented by a mobile phone called smartphone or Apple's iPad has a roughly rectangular flat display part providing functions of display and touch input. Portable electronic terminals are commonly called according to the diagonal dimension of the screen in inches. Many of the smartphones are four inches in diagonal, while portable electronic terminals functioning a personal computer such as iPad are mainly 10-inches or more in diagonal. However, recently portable electronic terminals with seven-inch screen have been wide-spreading. They are a medium size between the said four-inch screen and the said 10-inch screen.

The input to these portable electronic terminals is generally provided by tapping a screen by fingers. The input method of detecting electrostatic capacitance of fingers is recently used widely. Tapping screen is usually done by thumb or forefinger.

The outer size of a four-inch portable electronic terminal such as a smartphone are approximately 12 cm long and 7 cm wide. Such a terminal is normally held on four fingers except thumb in a hand in portrait mode, and the screen is tapped by thumb for input. The screen is small enough that almost all the part can be tapped by thumb, thus allowing both input and hold of the terminal.

The outer size of a 10-inch portable electronic terminal is approximately 25 cm long and 20 cm wide. Due to a large size of the screen, at the time of providing input, forefinger and/or thumb of one hand must be used, while another hand needs to hold the portable electronic terminal. It is impossible to do both input to the screen and hold of the terminal only by one hand.

A portable electronic terminal of a seven-inch screen is middle-sized between a four-inch screen terminal and a 10-inch screen terminal. The outer size of a seven-inch screen terminal is approximately 20 cm long and 12 cm wide. It is considerably larger than a four-inch smartphone. Therefore, when input is provided by the thumb of a hand while the terminal is held by the same hand, the reachable range of thumb tapping a screen is extremely limited.

FIG. 14 shows a perspective view of a front surface of a seven-inch portable electronic terminal held in a hand. The front surface 2 of a portable electronic terminal 1 includes a display part 3. The entire surface thereof also functions as an input part of the electrostatic capacitive type. Thus, input is provided by tapping the display part 3 by a finger. At this time the portable electronic terminal 1 is held with thumb 31 of a hand 30 on the front surface 2, and with forefinger 32, middle finger, ring finger, and little finger (these three fingers are not shown in FIG. 14) of a palm 36 on the back surface 4. The display part 3 is in the center of the front surface 2 and occupies most part of the front surface 2 except edges. FIG. 15 illustrates a perspective view of the back surface of a seven-inch portable electronic terminal held in a hand. The portable electronic terminal 1 is held, put between forefinger 32, middle finger, ring finger, and little finger on the back surface 4, and thumb 31 on a front surface 2 (not shown in FIG. 15).

FIG. 16 shows an arrow view of holding a seven-inch portable electronic terminal. The arrow shows the direction of an arrow A depicted in FIG. 14. The display part 3 is in the center of a front surface 2 of the portable electronic terminal 1. The portable electronic terminal 1 is held on a palm 36, forefinger 32, middle finger 33, ring finger 34 (not shown in FIG. 16), and little finger 35 (not shown in FIG. 16) and put between the palm 36 with those fingers (32-35) and thumb 31. When input to the portable electronic terminal 1 is provided by tapping a display part 3 with the thumb 31, firstly the thumb 31 shall be apart from the portable electronic terminal 1, and subsequently the thumb 31 taps a target part on the display part 3. At the time tapping with the thumb 31, the portable electronic terminal 1 needs to stop the tapping force. That means that the corresponding position on the back surface 4 to that of the thumb 31 on the front surface 2 with the thumb or peripheral part of that corresponding position must be held and supported with any of the palm 36, the forefinger 32, the middle finger 33, the ring finger 34 (not shown in FIG. 16), or the little finger 35 (not shown in FIG. 16). Therefore, the farthest reachable part of the thumb 31 on the display part 3 is limited to the part which can be grasped by the tip of the thumb 31 on the front surface 2 and the fingertips of other four fingers on the back surface 4. It results in extremely limited input while held in one hand. The farthest reachable part of the thumb of a standard-sized hand is at most about 8 cm from the side surface being held by the hand. Therefore, for ensuring all input, the portable electronic terminal must be held in one hand while input is provided by the other hand, just same as the case of a 10-inch portable electronic terminal. It is impossible to hold the terminal and provide input at the same time only by one hand.

In view of the above, the present invention intends to expand the reachable range of thumb of a hand for input of a seven-inch portable electronic terminal held in the same hand, thus to facilitate input operation.

Previous holding tools of a smartphone and a tablet PC, have, for example, an attached ring in order to fix a finger. FIG. 17 depicts a perspective view of a back surface having an attached ring of a portable electronic terminal. FIG. 17 shows a base 22 for a ring set in the approximate center of the back surface 4 of a portable electronic terminal 1, and a rotatable ring tray 23 being attached in the center of the base 22. A ring 21 passes through a hole 24 of the ring tray 23. The ring 21 in the hole 24 can change its position, from vertical to horizontal to the base 22.

FIG. 18 illustrates a perspective view of the back surface of a portable electronic terminal with a finger passing through a ring attached thereto. Middle finger 33 is often used for passing through a ring 21, however, any finger such as forefinger 32, ring finger 34, or little finger 35 are also used for passing through the ring 21. The rotatability of a ring tray 23 and the changeability of the angle of the ring 21 allow any finger to be used for passing through the ring 21 at the suitable position for each finger. Passing a finger in the ring 21 prevents the portable electronic terminal 1 from dropping off a hand even if the terminal 1 is not held between a finger in the ring 21 and thumb 31, thus enhancing the operational flexibility of the thumb 31. However, in spite of such flexibility, holding a portable electronic terminal 1 between the four fingers and the thumb 31 allows only the same reachable range of the thumb 31 as the case without a ring 21 depicted in FIG. 16.

With respect to a purpose of increasing the operation ability of input by thumb, in addition to a portable electronic terminal, many cases are found where a handle is attached to a game console controller. For example, FIG. 19 is a top view of a game controller of Nintendo Corporation. The controller 40 has a plurality of operation buttons 41 on the top surface, and it is connected to the main body of the game console (Not illustrated in FIG. 19) via a cord 42. Games are played by tapping operation buttons 41 with the thumbs of both hands. The game controller 40 has a plurality of handles 43 on its near left and its near right sides for ensuring the hold. The handle 43 being held with four fingers except thumb, especially three fingers, middle finger, ring finger and little finger, ensures a firm grip and increases a reachable range of the thumb and enhancing the operability. Other types of the game controller have almost the same structure. Holding a handle with three fingers except forefinger and thumb has been well-known in order to enhance flexibility of the thumb and the forefinger; it is similar to holding a pistol.

Other conventional methods of fixing a hand are disclosed in the below patent specifications. They are, unfortunately, not intended to enhance the input operability by thumb, and, in fact, they hardly increase the reachable range of thumb.

Japanese Unexamined Patent Application Publication No. 2012-175147 (JP-A-2012-175147), Japanese Unexamined Patent Application Publication No. 2012-248580 (JP-A-2012-248580).

The prior art provides various methods for secure handhold of a portable electronic terminal or the like. These methods allow increasing the flexibility of thumb through ensuring the hold of devices by hand. However, unfortunately, the prior art hardly allows increasing a reachable range of thumb, in spite of having increased flexibility of thumb and improved promptness of operations by thumb.

SUMMARY OF THE INVENTION

In view of the said problem, the present invention intends to provide a simple way to ensure holding a portable electronic terminal as well as to improve input operability by thumb through increasing the operational flexibility and the reachable range of thumb.

The present invention provides a holding tool of a portable electronic terminal which has a back surface and a front surface including a roughly rectangular flat display part. The tool comprises a stick which is attached to the portable electronic terminal and protrudes laterally from a side surface thereof. The stick is used by being put between four fingers except thumb, while the portable electronic terminal is held by the four fingers placed on the back surface.

This invention enables thumb to be apart from a portable electronic terminal and to be used freely while the portable electronic terminal which has been conventionally held by thumb and other four fingers. The said stick is put between, for example, forefinger and middle finger. It allows increasing the reachable range of the thumb and improves input operability by the thumb.

The present invention provides a simple means for increasing operational flexibility of thumb and increasing the reachable range as well as ensuring the hold of a portable electronic terminal, thus improves the operability of thumb input.

DESCRIPTION OF THE PREFERRED EMBODIMENTS

Hereinafter, the embodiments of the present invention will be described with reference to the drawings.

Embodiments 1

Figure 1:
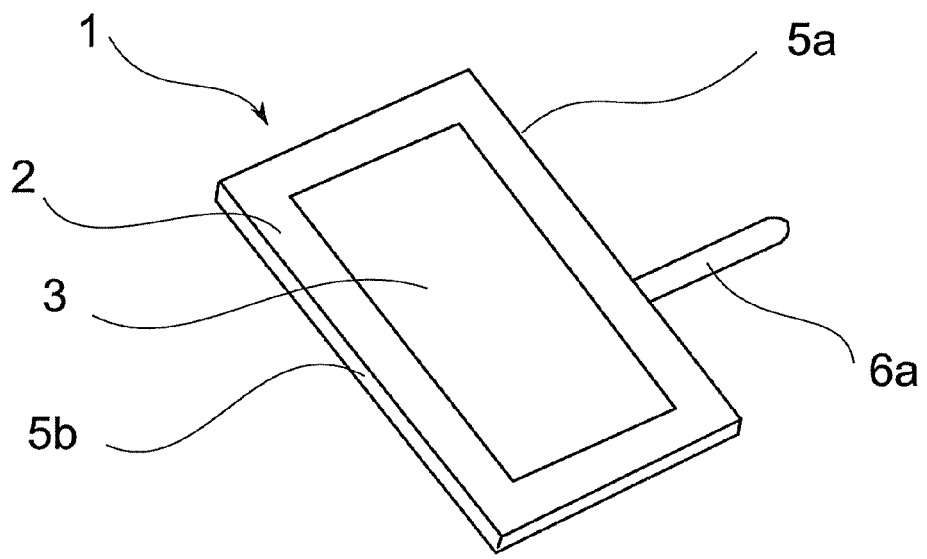
FIG. 1 is a perspective view of the front surface of the first embodiment of the present invention.
Figure 2:
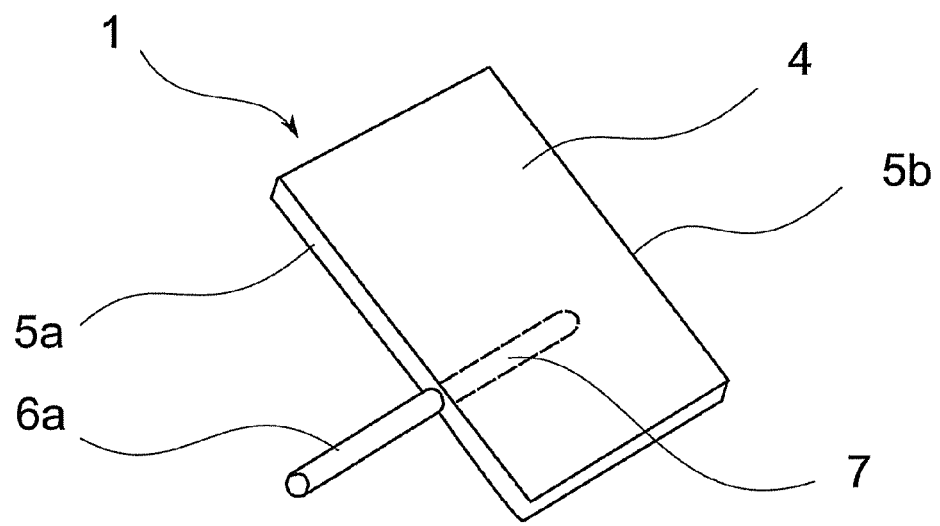
FIG. 2 is a perspective view of the back surface of the first embodiment of the present invention.
Figure 3:
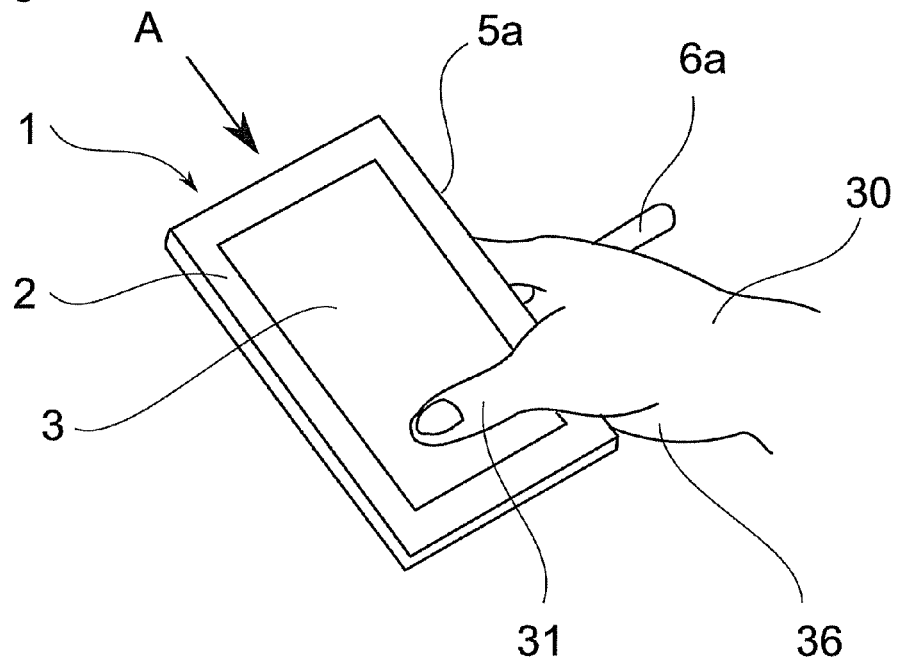
FIG. 3 is a perspective view of the front surface in use of the first embodiment of the present invention.
Figure 4:
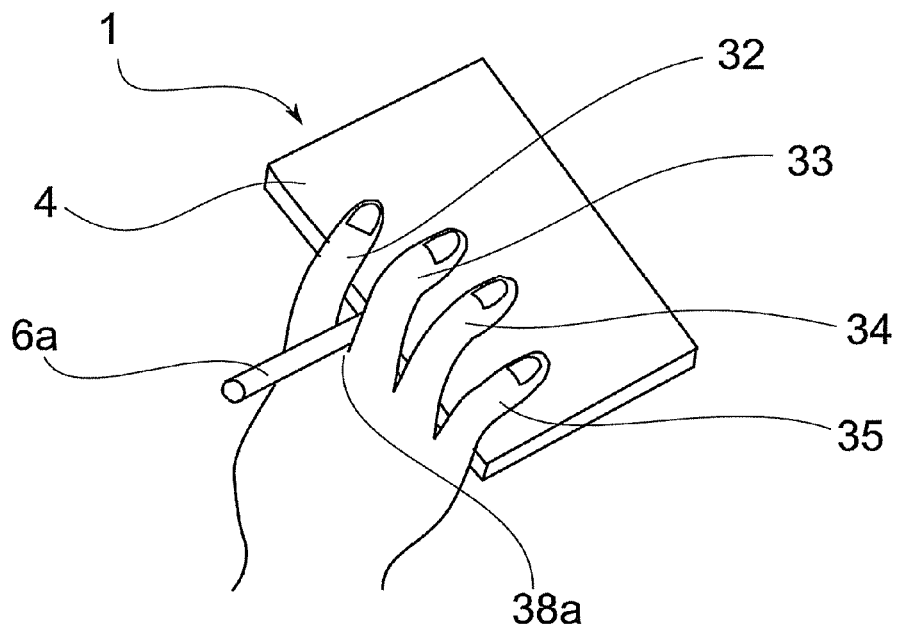
FIG. 4 is a perspective view of the back surface in use of the first embodiment of the present invention.
Figure 5:
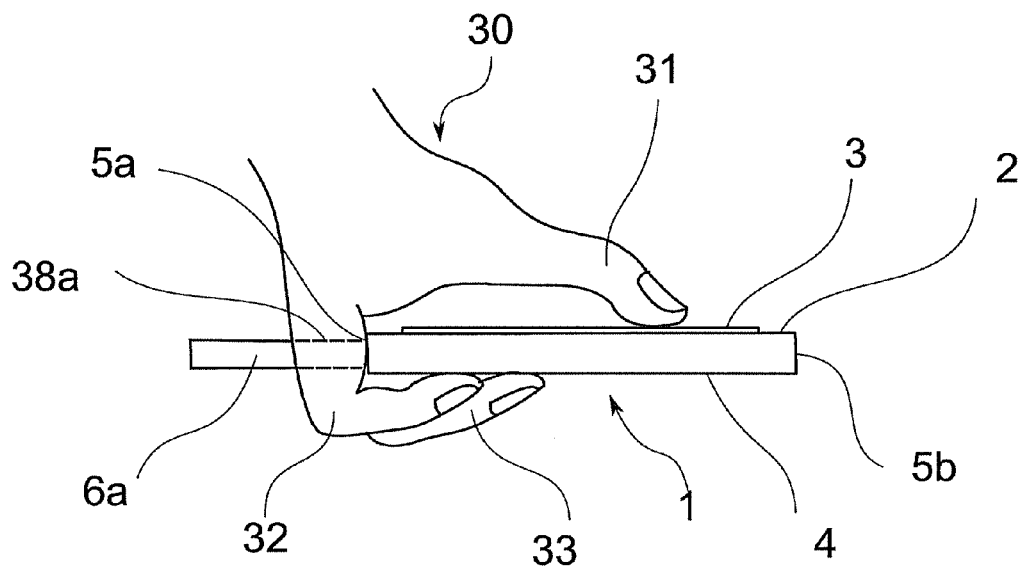
FIG. 5 is an arrow view of the first embodiment of the present invention.

Referring to FIGS. 1 to 5, will be described the first embodiment of a portable electronic terminal holding tool. FIG. 1 is a perspective view of the front surface of the first embodiment of the present invention. FIG. 2 is a perspective view of the back surface of the first embodiment thereof. FIG. 3 is a perspective view of the front surface upon the use of the first embodiment thereof. FIG. 4 is a perspective view of the back surface upon the use of the first embodiment thereof. FIG. 5 is an arrow view upon the use of the first embodiment thereof. In each figure, the front surface 2 of the portable electronic terminal 1 has a display part 3 whose entire surface also functions as an electrostatic capacitive input part. That is, the display part 3 receives input by tapping with fingers. The back surface 4 is in the opposite side to the front surface 2, and between them are side surfaces 5a, 5b and so on. The portable electronic terminal 1 is equipped with a stick 6a protruding vertically to the right side 5a, which protrudes laterally viewed from the point above the front surface 2. A storage space 7 illustrated by a dotted line in the perspective view of the back surface in FIG. 2 is a long cavity provided inside the portable electronic terminal 1. If a stick 6a is fixed always, it would bring inconvenience in carrying a portable electronic terminal 1 in a bag. Therefore, when not in use, it is designed to store the whole part of the stick 6a in the storage space 7 by releasing fixing mechanism device such as a fit taper. Upon the use of the portable electronic terminal 1, the stick 6a is pulled out from the storage space 7 and fixed for use.

FIGS. 3 and 4 illustrate a method of holding the first embodiment by hand upon the use. A portable electronic terminal 1 is held in one hand (the right hand in FIGS. 3 and 4) with the thumb 31 of a hand 30 put on the front surface 2, and with the forefinger 32, the middle finger 33, the ring finger 34, the little finger 35, and the palm 36 put on the back surface 4. At this time, the fingers are inserted from the direction of the front surface 2 and the stick 6a is placed on the interdigit 38a (i.e. part of the hand lying between any two adjacent fingers) between the forefinger 32 and the middle finger 33. Holding this way with the front surface 2 upward and the back surface 4 downward prevents the portable electronic terminal 1 from falling from the hand 30 even when the thumb 31 is apart from the front surface 2. However, without the stick 6a, if the thumb 31 is off from the portable electronic terminal 1, it easily drops from the hand 30 because the forefinger 32, the middle finger 33, the ring finger 34, and the little finger 35 do not support the gravity center of the portable terminal 1. The reason the portable electronic terminal 1 does not drop due to the stick 6a placed on the interdigit 38a between fingers is not because the forefinger 32 and the middle finger 33 pinch the stick 6a between them. Since the stick 6a attached to the right side surface 5a touches the interdigit 38a between the fingers, and it prevents the right side surface 5a from rising off the original position, which would cause the portable terminal 1 to drop from the hand. Moreover, touching the stick 6a on the interdigit between fingers always prevents a rise of the right side surface 5a, even if the angle of the portable electronic terminal 1 changes, the direction of the rise of the right side surface 5a also changes. As a result, that allows stable holding of the portable electronic terminal 1. In such a state, the thumb 31 is enabled to move freely on the display part 3 upon the portable electronic terminal 1 held only in one hand.

FIG. 5 is an arrow view upon the use of the first embodiment of the present invention. The arrow shows the direction of an arrow A depicted in FIG. 3. The back surface 4 of the portable electronic terminal 1 is held with forefinger 32, middle finger 33, ring finger, and little finger (The last two fingers are not shown in FIG. 5) while the stick 6a attached to the side surface 5a is placed on the interdigit 38a between the forefinger 32 and the middle finger 33. When the front surface 2 is upward in this state, the portable electronic terminal 1 does not drop from a hand 30, even if the thumb 31 is apart from the front surface 2 because the portable electronic terminal 1 is supported at least at three points, i.e. the tips of the forefinger 32 and the middle finger 33, and the interdigit 38a between the two fingers. The thumb 31 is enabled to move freely on the front surface 2 upon the portable electronic terminal 1 held in one hand.

At this time, if the thumb 31 reaches near the side surface 5b opposite to the side surface 5a and taps on the display part 3 for input, the portable electronic terminal 1 is going to drop from the hand 30 due to the force of tapping by the fingertip of the thumb 31. However, the tapping force of the fingertip of the thumb 31 which functions as a point of effort of the principle of leverage is stopped on the interdigit 38a functioning as a point of load, while the two fingertips of the forefinger 32 and the middle finger 33 function as a fulcrum. In other words, the portable electronic terminal 1 does not drop from the hand even if the thumb 31 taps the display part 3 near the side surface 5b. On the other hand, in the conventional usage, if thumb taps a far spot on the front surface 2 where the corresponding position of the forefinger 32 and the middle finger 33 do not support on the back surface 4 as described in FIG. 12, the portable electronic terminal 1 drops due to the lack of the said point of load. Therefore, it is impossible to tap a distant part of the display part 3 with the fingertip of the thumb 31 in the conventional usage.

Figure 12:
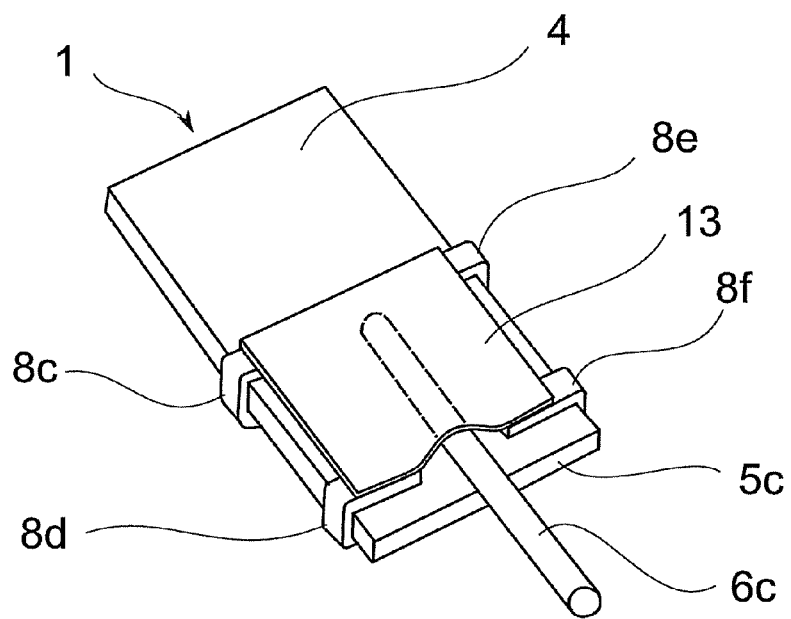
FIG. 12 is a perspective view of the back surface of the fifth embodiment of the present invention.

The comparison between FIG. 12 and FIG. 5 explicitly shows that the present invention enables the thumb fingertip of a hand to reach farther part on the display part 3 for input operation while holding a portable electronic terminal in the same hand.

Note that since the stick 6a receives a force as described above, it needs to be fixed firmly enough that any force applied to the stick 6a can not cause any change of an angle of attachment to the portable electronic terminal 1. Also, the stick 6a needs to be stiff enough to resist bending. The diameter of the stick 6a needs to be at most 2 cm in order that it is put between fingers. Regarding the length of the laterally protruding part of the stick 6a from the side surface 5a, it must be at least about 4 cm in order that the stick 6a fails to come off the interdigit between two fingers during the use. Furthermore, fixing strength of the stick 6a for attach to the portable electronic terminal 1, i.e. strength to resist coming off or resist breaking, is assumed to resist the force of at least about 500 g, since a seven-inch portable electronic terminal generally weighs approximately 300 g.

In addition, the stick 6a only needs to be fixed protruding vertically from the side surface 5a, but it may or may not be stored in a storage space 7. Instead of being stored in the storage space 7, the stick 6a may be detachable, and fixed by screws at that position. Also, the stick 6a may have a lock mechanism like a sleeve and a collapsible structure so that upon unlocked, it can be folded at its base and placed along the side surface 5a of the portable electronic terminal 1. It is sufficient if the stick 6a is fixed vertically protruding from the side surface 5a held in a hand upon the use.

Embodiment 2

Figure 6:
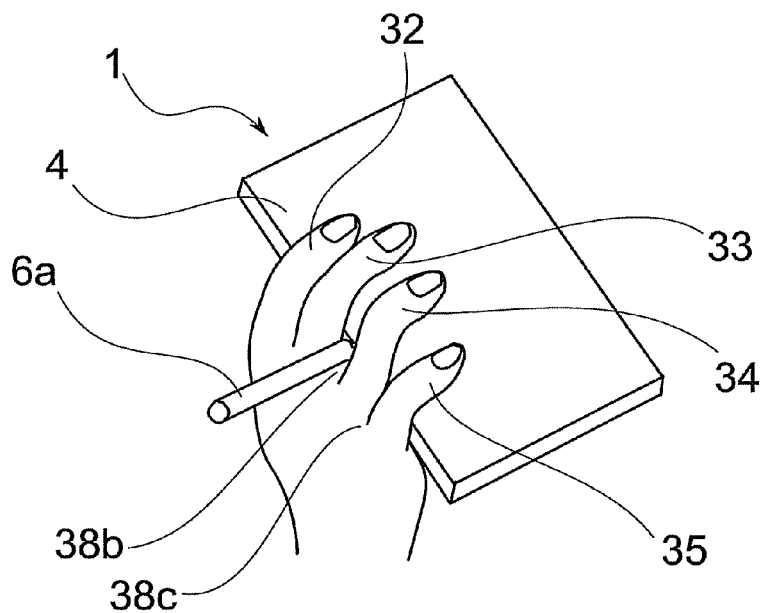
FIG. 6 is a perspective view of the back surface in use of the second embodiment of the present invention.

Referring to FIG. 6 will be described the method for using the second embodiment of the present invention. FIG. 6 is a perspective view of the back surface upon the use of the second embodiment. The reference numerals are the same as those used in FIGS. 1 to 5 of the first embodiment. The interdigit of fingers sandwiching a stick 6a is not limited to that between forefinger 32 and middle finger 33 as described in the first embodiment. In this second embodiment, the usage is almost the same as that of the first embodiment, except that the stick 6a is placed on the interdigit between the middle finger 33 and the ring finger 34 which are inserted to hold the stick 6a from the direction of the front surface 2. In this way of holding, the portable electronic terminal 1 is held mainly at three points: the fingertips of the middle finger 33 and the ring finger 34, and the interdigit 38b between these two fingers. The forefinger 32 and the little finger 35 are placed on the back surface 4 to assist the hold.

The reachable range of the fingertip of thumb 31 depends mainly on the distance between the fingertip of the thumb 31 and the interdigit of two fingers. In general, the distance between the fingertip of the thumb 31 and the interdigit 38b between the middle finger 33 and the ring finger 34 is slightly longer than the distance between the fingertip of the thumb 31 and the interdigit 38a between the forefinger 32 and the middle finger 33. Therefore, this second embodiment allows input operation on slightly wider part of the display part 3 than does the first embodiment. However, as the reachable range widens, more force is needed at each fingertip of the four fingers placed on the back surface 4.

As another way of hold, the stick 6a can be also placed on the interdigit 38c between ring finger 34 and little finger 35. In this case, more force needs to be applied on the little finger 35, however, the reachable range of the thumb 31 becomes wider.

Embodiment 3

Figure 7:
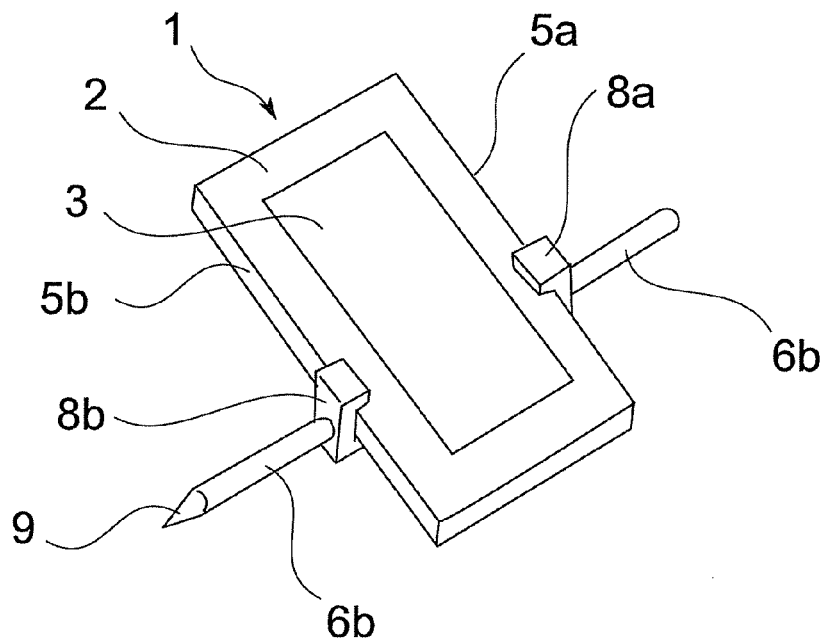
FIG. 7 is a perspective view of the front surface of the third embodiment of the present invention.
Figure 8:
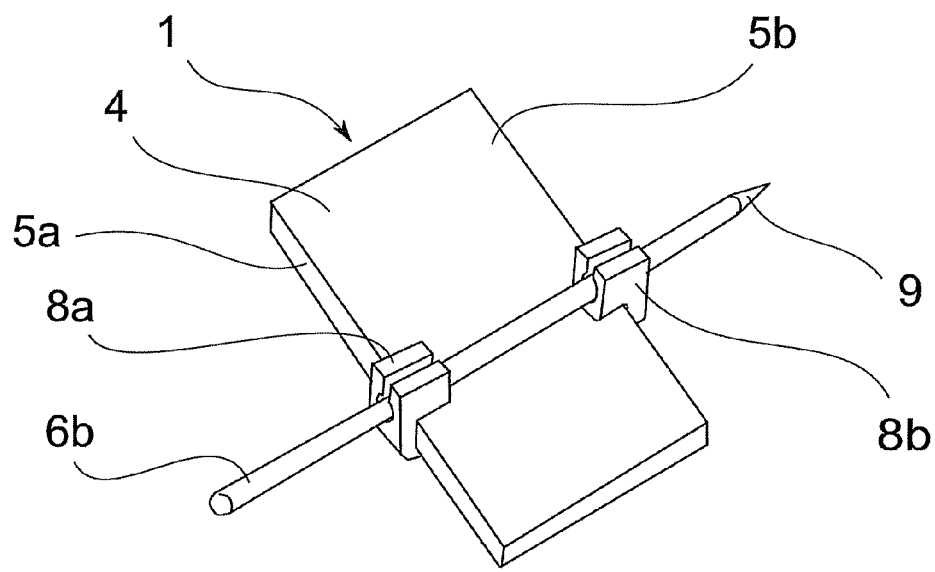
FIG. 8 is a perspective view of the back surface of the third embodiment of the present invention.
Figure 9:
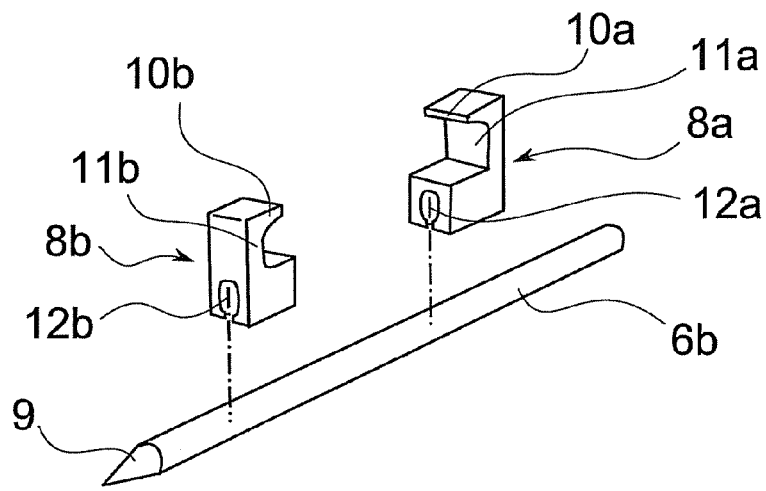
FIG. 9 is an exploded perspective view of a pinching part of the third embodiment of the present invention.

Referring to FIGS. 7 to 9 will be described the third embodiment of the present invention. FIG. 7 is a perspective view of the front surface of the third embodiment. FIG. 8 is a perspective view of the back surface thereof. FIG. 9 is an exploded perspective view of the pinching part thereof. The common parts in each figure to the first and the second embodiments are indicated by the same reference numerals. A portable electronic terminal 1 itself is the same as in the first and the second embodiments. The holding tool comprises two pinching parts 8a and 8b, and the stick 6b.

In this embodiment, the stick 6b itself is a writing tool with a pen nib 9 having a plastic or wooden outer side. As seen in FIGS. 7 and 8, the stick 6b is held and fixed by the first pinching part 8a and the second pinching part 8b. The portable electronic terminal 1 is hooked firmly by the first pinching part 8a and the second pinching part 8b. The end of the stick 6b protrudes vertically to the side surface 5a, that is, the attached stick 6b looks protruding laterally seen from a point above front surface 2. Similarly, the other end of the stick 6b protrudes vertically to the side surface 5b. That is, seen from a point above the front surface 2, the stick 6b is attached with its each end protruding in lateral direction from each side of the portable electronic terminal 1.

FIG. 9 shows the detailed illustration of a pinching part comprising parts 8a and 8b. FIG. 9 is an exploded perspective view of the pinching part of the third embodiment of the present invention. The pinching parts 8a and 8b are made of elastic rubber. A hook 10a is hooked on the front surface 2 with the side surface 5a of the portable electronic terminal 1 placed on the receiving part 11a of the pinching part 8a. Similarly, a hook 10b is hooked on the front surface 2 with the side surface 5b thereof placed on the receiving part 11b of the pinching part 8b. In this way, the pinching parts 8a and 8b are attached, facing in the opposite positions, to the side surfaces 5a and 5b respectively of the portable electronic terminal 1. Furthermore, one end of the stick 6b is inserted into a slit 12a of the pinching part 8a, and subsequently, the other end thereof is inserted into a slit 12b of the pinching part 8b. The inserted positions are described by a alternative long and short line in FIG. 9. Since the slit width is designed almost the same as the diameter of the stick 6b or slightly narrower than that, the stick 6b is firmly fixed at the pinching parts 8a and 8b by the shrinkage of the elastic rubber. At the same time, this structure fixes the distance between the pinching parts 8a and 8b, thus the portable electronic terminal 1 is firmly held by these two pinching parts, allowing firm fixation of the stick 6b to the portable electronic terminal 1.

Regarding the hooks 10a and 10b, they are slightly tapered so as to be attached to portable electronic terminals of various thickness. This enables the hooks 10a and 10b to hook portable electronic terminals of 8 mm to 11 mm thickness. The expansion and contraction of the elastic rubber allows secure fixation with flexibility toward a variety of dimensions.

The illustrated structure of this embodiment comprising a stick 6b as a holding tool and pinching parts 8a and 8b allows a portable electronic terminal 1 to be used in the same manner as that described in the first embodiment. That is, the thumb of a right hand is used flexibly with the portable electronic terminal 1 held in the right hand and the thumb has wider reachability on the front surface 2 for input.

Furthermore, this structure allows the same usage when the portable electronic terminal 1 is held only in a left hand, which is symmetrical to the usage by a right hand. The left thumb is used flexibly with the portable electronic terminal 1 held in the left hand and the left thumb has wider reachability on the front surface 2 for input. This structure has a convenient feature which allows continuing input operation for a long time by switching a hand for input and hold; when you are tired by using a right hand for input and hold, you can switch to the left hand and continue the operation. The operation is always done only by one hand.

Moreover, it provides convenience to use the stick 6b as a writing tool, and taking notes by detaching it when necessary.

Furthermore, the stick 6b may be an input stylus for tapping the display part 3. It has convenience to use the input stylus immediately in the right hand by detaching it from the portable electronic terminal 1 which is held in the left hand.

Note that for operation by one hand, whether it is a right hand or a left hand, the total length of the stick 6b needs to be at least 20 cm. This is the total of the following: The length of a laterally protruding part at the right side which also allows safely placement on the interdigit is about 4 cm. Similarly, the length of a laterally protruding part at the left side which also allows safely placement on the interdigit is about 4 cm. The width of a portable electronic terminal 1 is at least about 12 cm. However, such length is rare as an ordinary writing tool or an ordinary input stylus.

Also note that if operations are provided only by one hand, it does not require the stick 6b to be as long as described above. In such a case, the total length of the stick 6b needs to be 16 cm: the total of the width of a portable electronic terminal 1, about 12 cm, and about 4 cm. The length of 16 cm is rather common as ordinary writing tools. That is, ordinary writing tools such as a pencil can substitute for the stick 6b.

Note that the said examples of this embodiment show the entire part of the pinching parts 8a and 8b is made of elastic material, however, not the entire part has to be elastic. It is sufficient that only the parts for hooking for fixation or only the parts for fixing the stick 6b need to be made of elastic materials.

Embodiment 4

Figure 10:
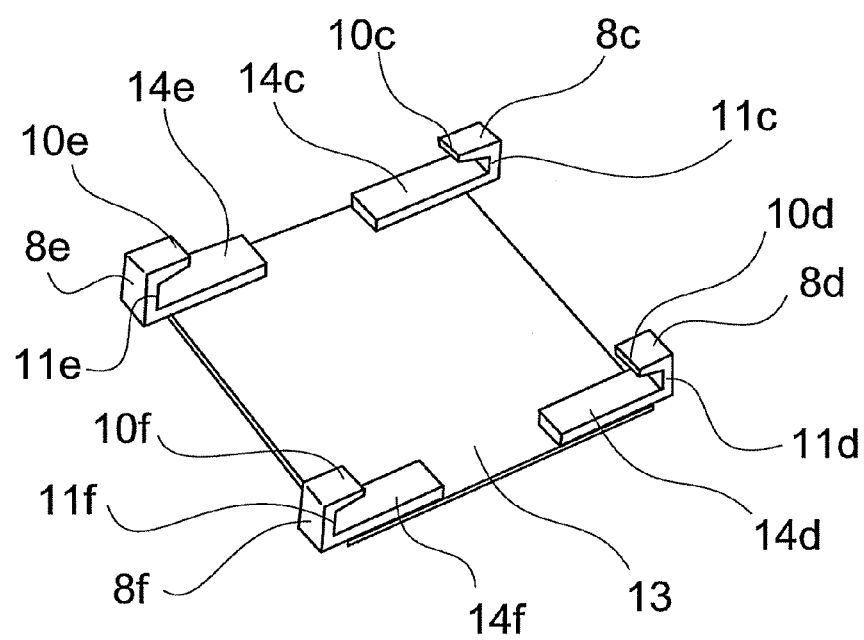
FIG. 10 is a perspective view of a pinching part of the fourth embodiment of the present invention.
Figure 11:
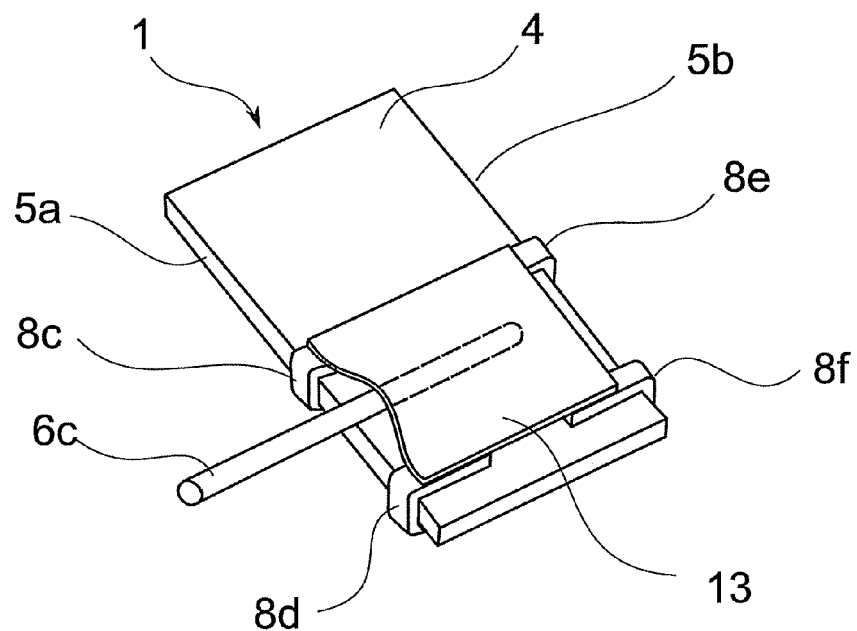
FIG. 11 is a perspective view of the back surface of the fourth embodiment of the present invention.

Referring to FIGS. 10 and 11, will be described the fourth embodiment of the present invention. FIG. 10 is a perspective view of a plurality of pinching parts of the fourth embodiment of the present invention. The portable electronic terminal 1 itself is the same as that of the first and second embodiments. The holding tool comprises pinching parts 8c, 8d, 8e, 8f and a plate 13 and a stick 6c. That is, this embodiment has four pinching parts to pinch a portable electronic terminal 1. The pinching part 8c is made of metal, and comprises a hook 10c attached to the front surface 2 of the portable electronic terminal 1, a receiving part 11c attached to a side surface, and a bottom 14c contacting the back surface 4. The other three pinching parts have the same components; The pinching part 8d is made of metal, comprising a hook 10d attached to the front surface 2 thereof, a receiving part 11d on the side surface, and a bottom 14d contacting the back surface 4. In the same way, the pinching part 8e is made of metal, comprising a hook 10e attached to the front surface 2 thereof, a receiving part 11e on a side surface, and a bottom 14e contacting the back surface 4. Also, the pinching part 8f is made of metal, comprising a hook 10f attached to the front surface 2 thereof, a receiving part 11f on the side surface, and a bottom 14f contacting the back surface 4. The bottoms 14c, 14d, 14e, and 14f of the four pinching parts 8c, 8d, 8e, and 8f are attached to the four corners of a rectangular elastic board 13. The board 13 is a thin rubber plate. Each side of the bottoms 14c, 14d, 14e, and 14f which contacts the back surface 4 of the portable electronic terminal 1 is applied adhesive polyurethane gel.

FIG. 11 is a perspective view of the back surface of the fourth embodiment of the present invention. In FIG. 11, those common parts to the first and the second embodiments are indicated by the same reference numerals. The board 13 is mounted on the back surface 4 of the portable electronic terminal 1, and the pinching parts 8c and 8d hook the side surface 5a thereof. In addition, the pinching part 8e and 8f hook the side surface 5b thereof. Since the distance between the pinching part 8c and 8e is designed to be slightly shorter than the width of the portable electronic terminal 1, the pinching parts 8c and 8e and board 13 do not slip off from the portable electronic terminal 1 due to the shrinking force of the elastic board 13. Also, the pinching parts 8d and 8f are designed in the same way, so that the pinching parts 8d and 8f and the board 13 do not slip off therefrom.

When the stick 6c is half inserted from the side surface 5a into the middle of the pinching parts 8c and 8d whose space is between the board 13 and the back surface 4 of the portable electronic terminal 1, the stick 6c is pressed onto the back surface 4 due to the shrinking force of the board 13 and fixed while the half of the stick 6c protrudes vertically to the side surface 5a, which looks protruding laterally seen from a point above the front surface 2. Just as in the first and the third embodiments, when holding the stick 6c on the interdigit between forefinger and middle finger, and holding the board 13 on the back surface 4 with the forefinger, the middle finger, ring finger and little finger, the parts where the fingers are placed on the board 13 contact tightly to the back surface 4 of the portable electronic terminal 1, thus it ensures holding of the portable electronic terminal 1. Also, if unexpected stronger force is applied to the stick 6c, the stick 6c is apart with the board 13 from the back surface 4, that stress causes each of the pinching parts 8c and 8d is going to move. However, adhesive material applied to the bottom 14c of the pinching part 8c and bottom 14d of the pinching part 8d prevents such move, eventually maintains the fixed position of the stick 6c.

Therefore, same as in the first and the third embodiments, the fourth embodiment increases the flexibility of thumb and widens its reachable range, facilitating input operation to the portable electronic terminal 1.

Note that upon providing input while holding a portable electronic terminal 1 in the left hand, the stick 6c is half inserted from the side surface 5*b* into the middle of the two pinching parts 8*e* and 8*f* between the board 13 and the back surface 4 thereof. Then, the stick 6*c* is pressed against the back surface 4 by the shrinking force of the elastic board 13 and fixed, while the other half of the stick 6*c* protrudes vertically to the side surface 5*a*, which looks protruding laterally viewed from a point above the front surface 2. In this way, operations and holding by the left hand brings the same convenience as those by the right hand.

Embodiment 5

Figure 13:
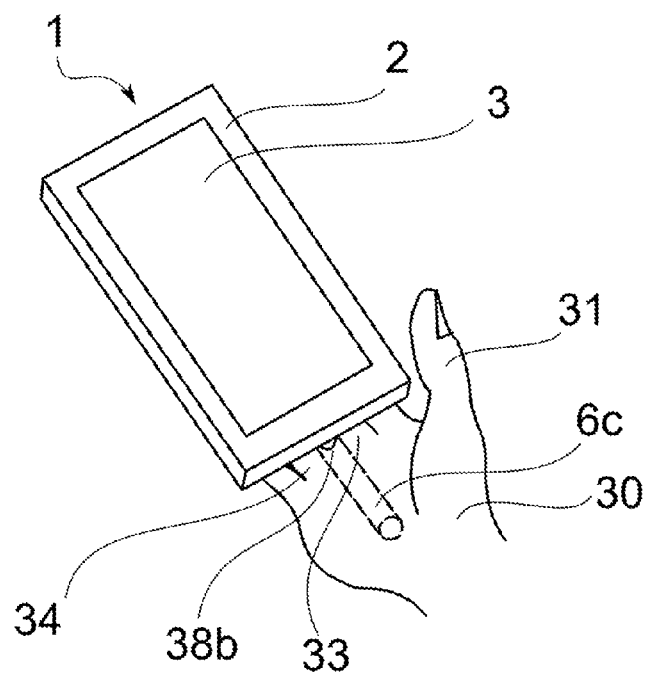
FIG. 13 is a perspective view of the front surface in use of the fifth embodiment of the present invention.
Figure 14:
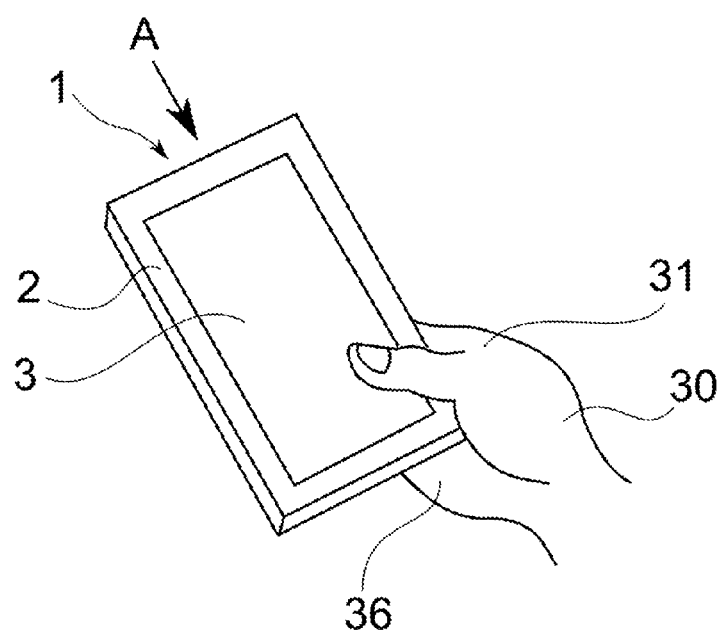
FIG. 14 is a perspective view of the front surface of a seven-inch portable electronic terminal held in a hand in a conventional way.
Figure 15:
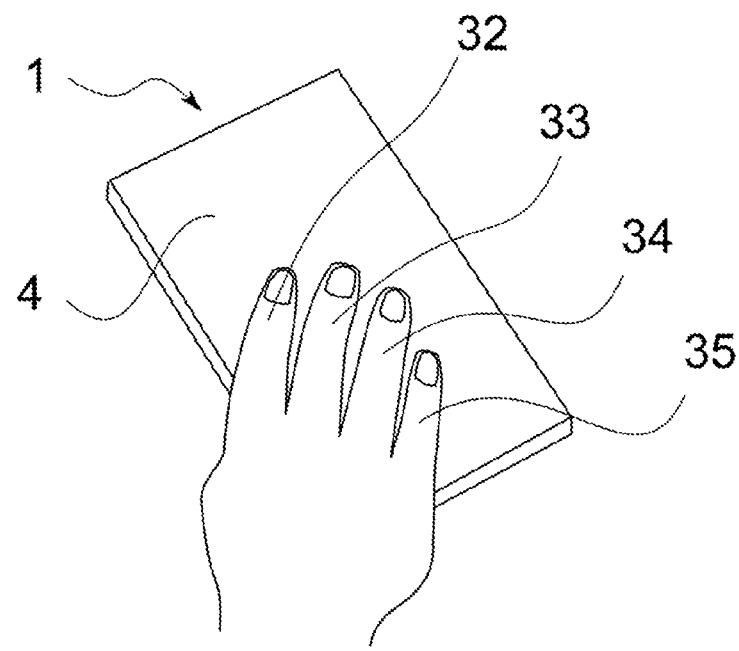
FIG. 15 is a perspective view of the back surface of a seven-inch portable electronic terminal held in a hand in a conventional way.
Figure 16:
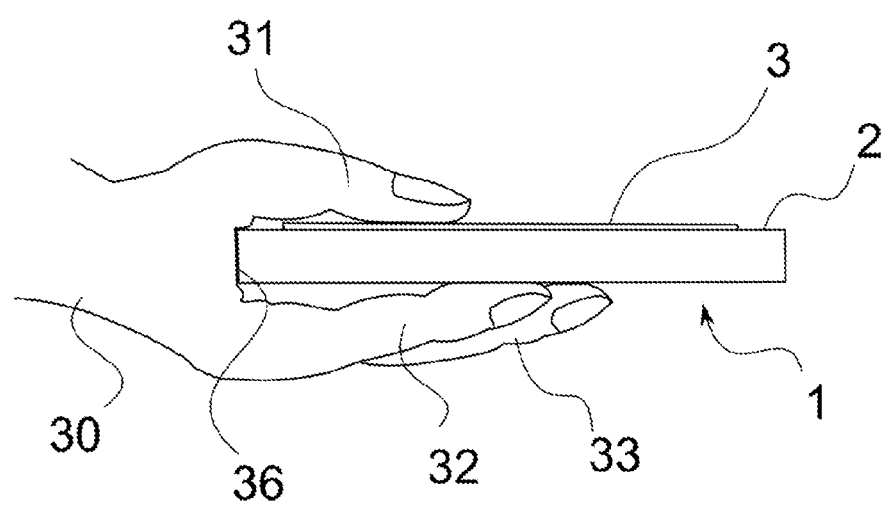
FIG. 16 is an arrow view of a seven-inch portable electronic terminal held in a hand in a conventional way.
Figure 17:
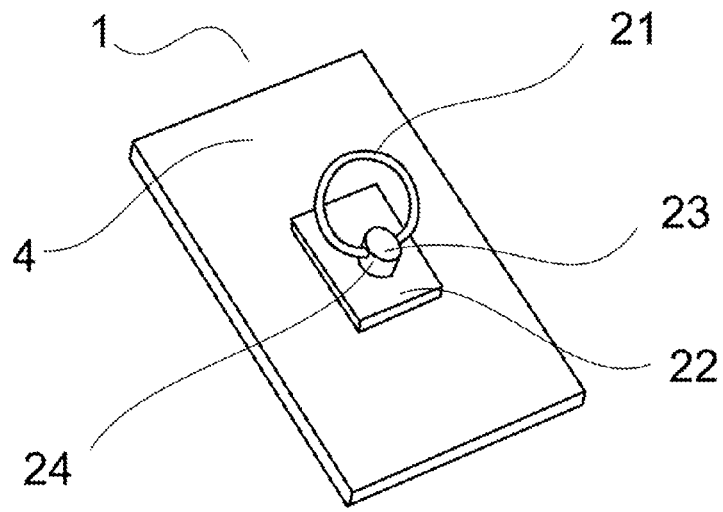
FIG. 17 is a perspective view of the back surface of a portable electronic terminal having a conventional ring.
Figure 18:
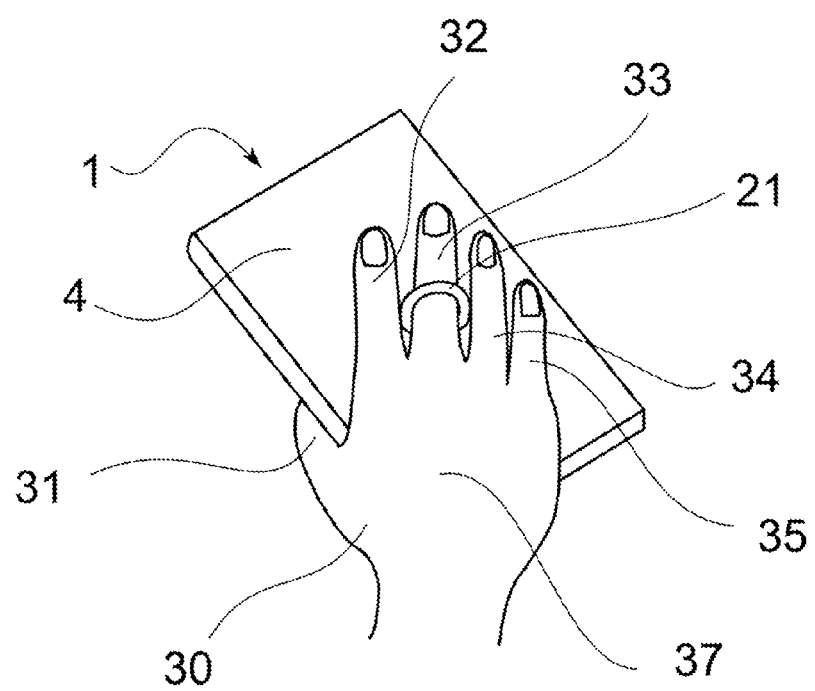
FIG. 18 is a perspective view of the back surface of a portable electronic terminal having a conventional ring through which a finger is passed.
Figure 19:
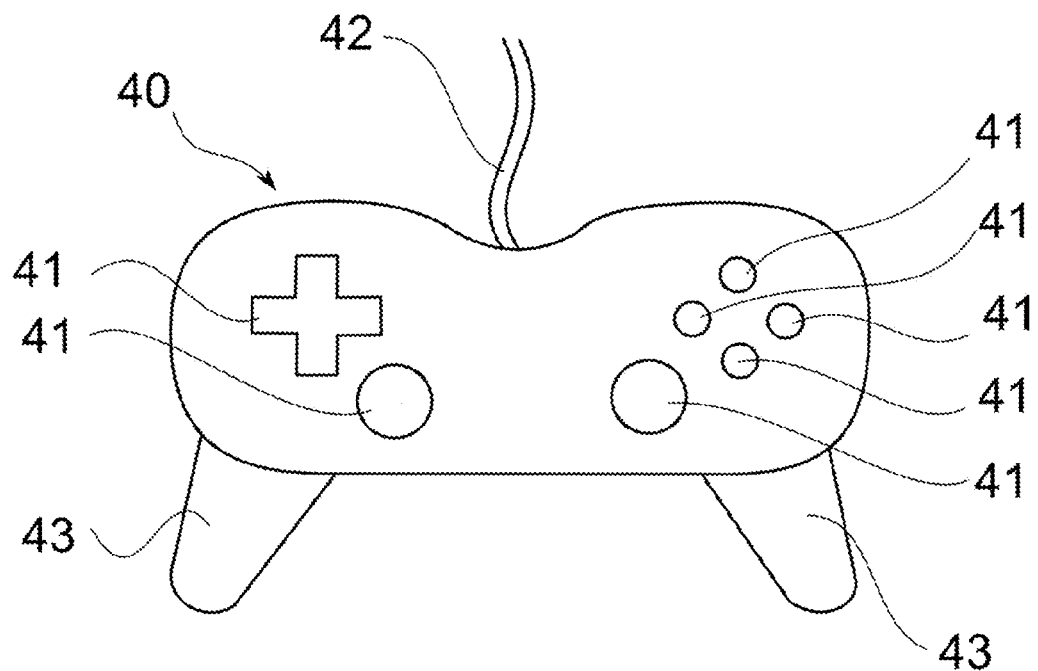
FIG. 19 is a top view of a conventional game console controller.

Referring to FIGS. 12 and 13, will be described the fifth embodiment. FIG. 12 is a perspective view of the back surface of the fifth embodiment of the present invention. In FIGS. 12 and 13, common parts to the first to the third embodiments are indicated by the same reference numerals. The portable electronic terminal 1 itself is the same as that of the fourth embodiment. The holding tool comprises pinching parts 8*c*, 8*d*, 8*e*, and 8*f*, a board 13, and a stick 6*c*. The pinching parts of the fifth embodiment are exactly the same as those of the fourth embodiment, and attached exactly in the same manner. That is, the pinching parts and an elastic board which have been described in FIG. 10 are placed on the back surface 4 of the portable electronic terminal 1, while the pinching parts 8*c* and 8*d* hook the side surface 5*a* thereof. The pinching parts 8*e* and 8*f* also hook the side surface 5*b* thereof. The difference from the fourth embodiment is the position where the stick 6*c* is inserted. In the present embodiment, the stick 6*c* is inserted in 90 degree different direction from that of the inserted stick 6*c* in the fourth embodiment, between the portable electronic terminal 1 and the board 13. In other words, insert the stick 6*c* half into a side surface 5*c* which is vertical to both side surfaces 5*a* and 5*b*. Then, the stick 6*c* is pressed against the back surface 4 due to the shrinking force of the elastic board 13 and fixed, while the remaining half of the stick 6*c* protrudes vertically from the side surface 5*c*, which looks protruding laterally seen from a point above the front surface 2.

FIG. 13 is a perspective view of the front surface in use of the fifth embodiment of the present invention. The stick 6*c* is placed on the interdigit between middle finger 33 and ring finger 34, sandwiched by these two fingers. The stick 6*c* is represented by a dashed line on the back surface of a hand 30 in FIG. 13. In this embodiment, the hand 30 holds the portable electronic terminal 1 in portrait mode. This way of holding increases the flexibility of thumb, allowing it to reach wider range of the display part 3. However, since holding the display part 3 thereof in portrait mode, although it allows the flexibility of the thumb and its wider reachability, in fact, it enables the thumb to reach only almost entire lower half of the display part 3, but not the entire upper half thereof. However, even such holding mode facilitates holding for reading e-books, for example, so that allows turning pages forward or backward with ease and promptness. Since no grip force is needed in holding the portable electronic terminal 1, one can enjoy reading with feeling relaxed.

Note that although in the fourth and the fifth embodiments, elastic materials are used for the board 13, they may be used for the pinching parts 8*c*, 8*d*, 8*e*, and 8*f* instead of the board 13, thus bringing almost the same effects. That is, as the shrinking force for attaching the holding tool to a portable electronic terminal 1, elastic pinching parts can be used instead of using an elastic board, which results in allowing insertion of the stick 6*c* due to elasticity of the pinching parts, fixing the stick 6*c* due to the shrinking force of the pinching parts. Furthermore, not the entire part of the board 13 needs to be made of elastic material. Only the part which fixes the stick 6*c* needs elasticity. The same can also be said about the elasticity of the pinching parts 8*c*, 8*d*, 8*e*, and 8*f*.

Note that the pinching part 8*c*, 8*d*, 8*e*, and 8*f* and the board 13 in the fourth and the fifth embodiments need not be configured separately, but can be integral. The latter has the same configuration and provides the same effects. It may be, for example, one-body molded elastic resin material.

Note that the total length of the stick 6*c* used in the fourth and the fifth embodiments need to be at least 9 cm. The length is the total of the following two length: at least about 4 cm which allows secure hold of the stick 6*c* laterally protruding from a side surface and being stably placed on the interdigit between fingers. And at least about 5 cm which ensures fixation of the stick 6*c* between the board 13 and the back surface 4 by sufficient force. Ordinary writing tools such as a ballpoint pen is longer than dozen cm, enough to satisfy the said length. In other words, generally used writing tools have high possibility of being used as the stick 6*c* of the present invention.

Further, the portable electronic terminal holding tools in any embodiment are simple and lightweight. A portable electronic terminal itself is light enough to weigh about 300 g. Since the holding tools of the present invention are designed to provide more comfortable hold of such portable electronic terminals, heavy weight is inappropriate for the tools. To fulfill such conditions, any embodiment described above has configuration of very simple and lightweight components, so that it allows implementation of at most about 100 g-weigh holding tools. Such light-weighed holding tools cause no troubles related to the weight. It enables the tools to ensure the holding a portable electronic terminal with little force and to improve the input operability by the thumb (i.e. reachability of thumb for input).

Embodiment 6

Figure 20:
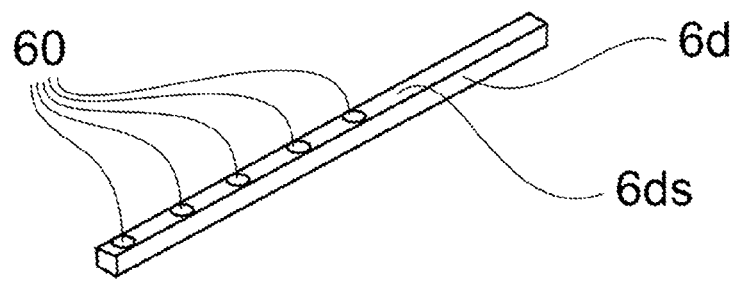
FIG. 20 is a perspective view of the sixth embodiment of the present invention.
Figure 21:
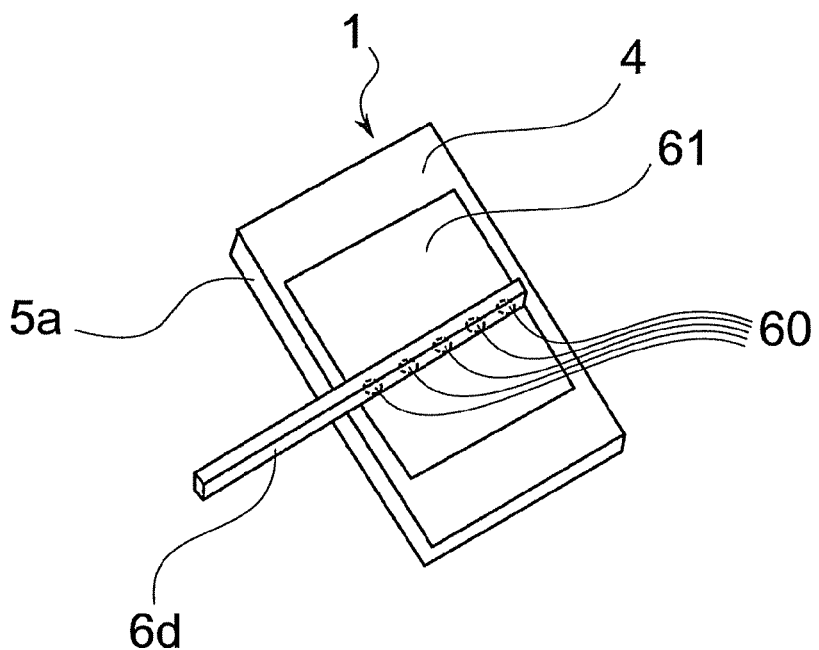
FIG. 21 is a perspective view of the back surface of the sixth embodiment of the present invention.

Referring to FIGS. 20 and 21, will be described the sixth embodiment. FIG. 20 is a perspective view of the sixth embodiment of the present invention. FIG. 21 is a perspective view of the back surface of the sixth embodiment thereof. The common parts in the figures to the previous embodiments are indicated by the same reference numerals. FIG. 20 shows that a stick 6*d* is square pole-shaped having a plurality of coin-shaped neodymium magnets 60 embedded in a side surface 6*ds*. FIG. 21 illustrates that a sheet iron 61 of about 1 mm in thickness is attached by adhesive to the back surface 4 of the portable electronic terminal 1. In the time of use, the stick 6*d* shown in FIG. 20 is attached to the sheet iron 61 by the magnetic force of the magnets 60, and then fixed on the back surface 4. One end of the stick 6*d* protrudes approximately 4 cm laterally from the side surface 5*a* of the portable electronic terminal 1. The stick 6*d* is detachable when the portable electronic terminal 1 is not used, by applying a removing force against the magnetic force.

The method of holding the portable electronic terminal holding tool which is configured in that way is the same as that described in the previous embodiments. Although it is not illustrated with drawings, the way of holding is as follows: First, forefinger 32 and middle finger 33 are inserted from the direction of the front surface 2, passing by the side surface 5*a* of the portable electronic terminal 1, to put the stick 6*d* between the two fingers. Then, the fingertips of the forefinger 32 and the middle finger 33 are placed on the sheet iron 61 on the back surface 4 to hold the portable electronic terminal 1. The stick 6d is on the interdigit 38a between the forefinger 32 and the middle finger 33, and hold the portable electronic terminal 1 according to the principle of the leverage. In other words, the gravity center of the portable electronic terminal 1 functions a point of effort, or the part where the thumb 31 tap functions a point of effort. And then the fingertips of the forefinger 32 and the middle finger 33 as fulcrum. And the interdigit 38a as a point of load. The balance of the force according to the principle of the leverage enables the portable electronic terminal 1 to be held securely.

Also, when the portable electronic terminal 1 is not used, detaching the stick 6d with force therefrom, the magnets 60 can be detached from the sheet iron 61. The sheet iron 61 remains adhered to the back surface 4 even when the portable electronic terminal 1 is not used. Such a sheet iron remaining on the back surface 4 causes almost no inconvenience in storing the portable electronic terminal 1 in a bag or carrying it. Only the stick 6d having magnets 60 needs to be attached or detached in use or not in use respectively.

Note that as magnets 60, general ferrite magnets or rubber magnets made of kneaded magnet powder may substitute for the neodymium magnets if the latter are too strong and difficult to detach. Also, as a means for adhering the stick 6d to the back surface 4, adhesive materials can be used as the substitute of the sheet iron 61 and magnets 60. Alternatively, the stick 6d can be fixed with screws by providing screw holes on the back surface 4. Or fixing the stick 6d by inserting its part to a keyway which is provided on the back surface 4. In use of a portable electronic terminal 1, the stick 6d receives reaction force of the force exerting the interdigit 38a between fingers according to the principle of the leverage. This reaction force works as detaching force of the stick 6d vertically from the back surface 4. Therefore, it suffices if the holding tool has adhesive strength to the back surface 4 enough to resist the said reaction force, and its stick 6d can be detached, or stored, or folded when not in use.

Embodiment 7

Figure 22:
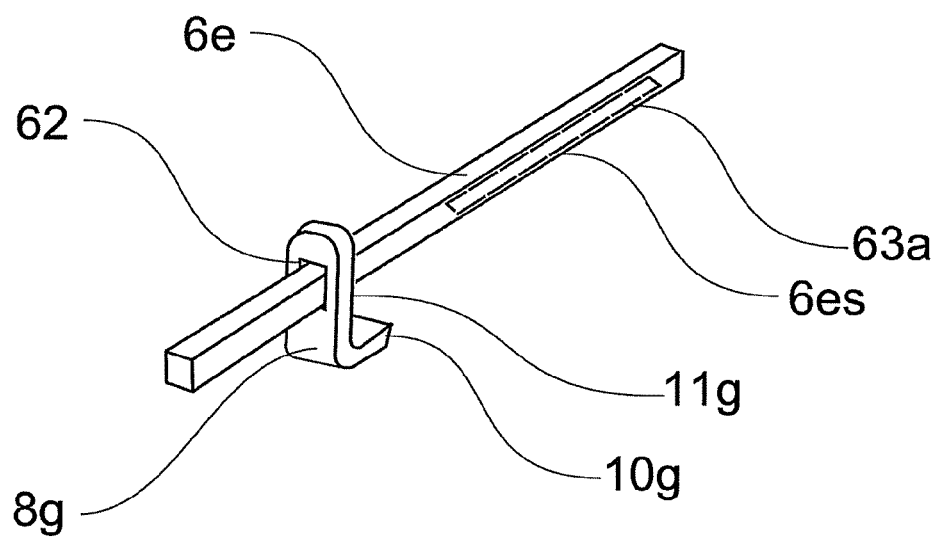
FIG. 22 is a perspective view of the seventh embodiment of the present invention.
Figure 23:
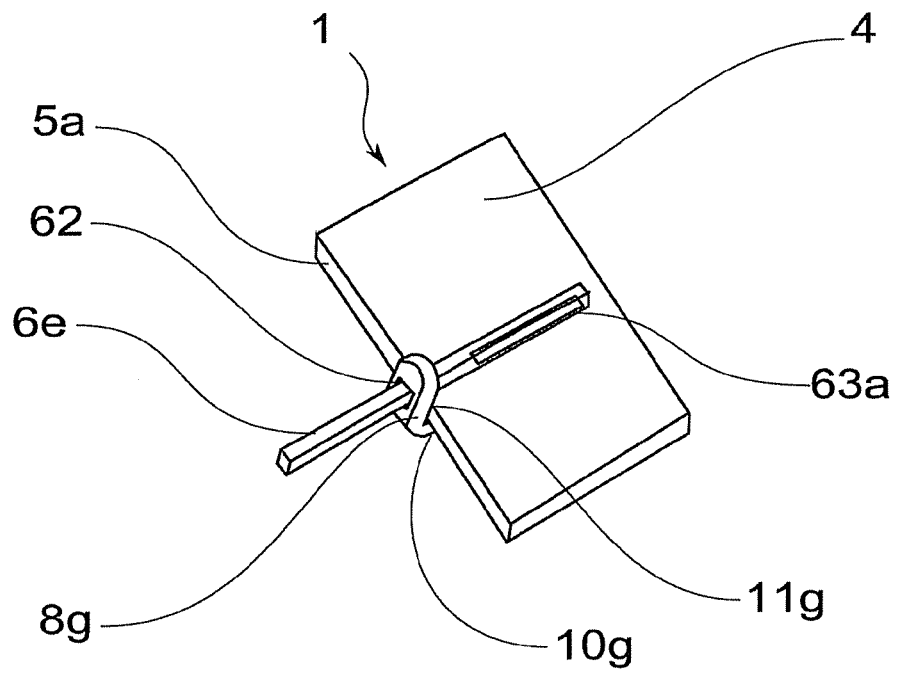
FIG. 23 is a perspective view of the back surface of the seventh embodiment of the present invention.

Referring to FIGS. 22 and 23, will be described the configuration of the seventh embodiment of the present invention. FIG. 22 is a perspective view of the seventh embodiment of the present invention. Common parts to the previous embodiments are indicated by the same reference numerals in the figures. A pinching part 8g is made of elastic rubber, whose end has a hook 10g for being hooked to the edge of the front surface 2 of a portable electronic terminal 1 (not shown in these figures), while the center of the pinching part 8g has an elastic receiving part 11g and a through-hole 62 for a stick to pass through. A stick 6e passes through the through-hole 62. The stick 6e is rectangular prism shaped having an viscous part 63a attached to a part on a side 6es of the stick 6e from one end to the center of the stick 6e. FIG. 23 is a perspective view of the back surface of the seventh embodiment of the present invention. The pinching part 8g has a hook 10g which is hooked to the edge of the front surface 2 of the portable electronic terminal 1, and has a receiving part 11g which contacts the side surface 5a. The stick 6e passes through the through-hole 62, and its viscous part 63a is adhered to the back surface 4 of the portable electronic terminal 1. The distance between the hooks 10g and stick 6e is designed to be shorter than the thickness of the portable electronic terminal 1 when no external force is applied. Upon pinching the portable electronic terminal 1 with the hook 10g and the stick 6e as described above, the receiving part 11g of the rubber-made pinching part 8g is pulled and stretched. The resilience causes strong force of pinching the portable electronic terminal 1 with the hook 10g and the stick 6e, thus enabling the pinching part 8g and the stick 6e to be fixed firmly to the portable electronic terminal 1. This means that only the viscous part 63a can adhere the stick 6e to the portable electronic terminal 1, but the hook 10g hooked to the edge of the front surface 2 increases the strength for the fixation. One end of the stick 6e protrudes laterally from the side surface 5a.

The method of hand-holding a portable electronic terminal 1 having this configuration is the same as described in each of the aforementioned embodiments. The advantage of the seventh embodiment is a simple structure to fix a stick. That is, while the third embodiment requires two pinching parts to fix a stick, the present embodiment requires only one pinching part for fixation. Also it reduces inconvenience caused by part of the front surface of the portable electronic terminal being covered by the hooks of the pinching parts. Also, while the sixth embodiment requires a sheet iron to cover the back surface in order to fix the stick, the present embodiment does not require such an auxiliary item. A disadvantage of the present embodiment is difficulty of using, for example, a pencil of a round outer as a stick, because a cylindrical shaped stick would decrease an area to which the viscous part is attached, thus reducing the adhesive strength.

Note that at the time of stopping use of a portable electronic terminal 1, the hook 10g is detached. The detaching releases the shrinking force of receiving part 11g. Then, the stick 6e becomes not fixed in the pinching part. And when the protruding part of the stick 6e is pushed down slowly and force is applied for the stick 6e to be detached from the back surface 4, the adhesive portion 63a of the stick 6e is detached slowly from the back surface 4. And eventually, the pinching part 8g and the stick 6e are detached from the portable electronic terminal 1. In this case, the adhesive strength of the viscous part 63a in the second use may become a little weaker than that in the first use. Therefore, it is preferable for the viscous part 63a to be such a type that regain adhesive strength by water washing. For example, ester-based polyurethane polymer, or urethane-based adhesive elastomer are preferably used. However, if the stick 6e is not detached repeatedly, general sort of permanent adhesive material can be used.

Note that for a structure for holding and fixing the stick 6e at pinching part 8g, fixing the stick 6e in slits as described in the third embodiment may be applied, instead of providing a through-hole as described above.

Embodiment 8

Figure 24:
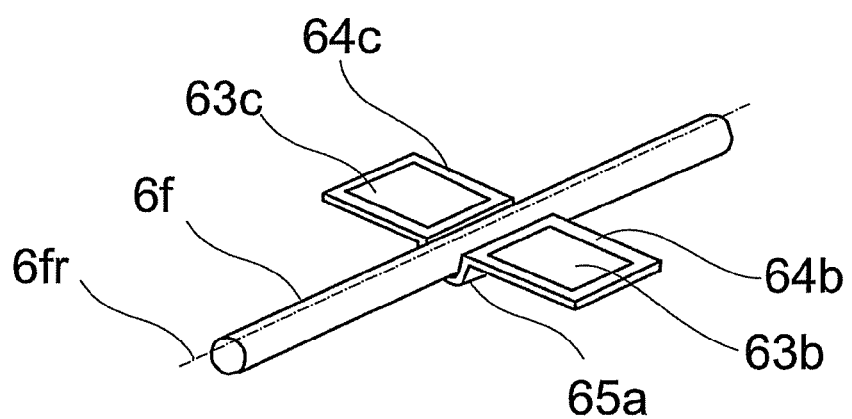
FIG. 24 is a perspective view of the eighth embodiment of the present invention.

Referring to FIG. 24, will be described the eighth embodiment of the present invention. FIG. 24 is a perspective view of the eighth embodiment of the present invention. In FIG. 24, the middle of a cylindrical stick 6f is put between a flat part 64b and a flat part 64c and put into a stick-supporting part 65a which connects to both flat parts 64b and 64c. The stick-supporting part 65a has a U-shaped cross-section. The flat parts 64b and 64c and the stick-supporting part 65a are originally of a single plate, and the center of the plate is bent to make a U-shaped groove to hold the stick 6f. The stick 6f is just put in, but not fixed with an adhesive. An viscous part 63b is stuck to the flat part 64b, and the viscous part 63c is stuck to the flat part 64c. The viscous parts 63b and 63c are made of adhesive material of ester-based polyurethane polymer. The viscous parts 63b and 63c, and the ridgeline 6fr of the stick 6f are on the same level, namely they are flush. In use of a portable electronic terminal 1, this stick 6f and flat parts 64b and 64c are attached to the back surface 4 thereof. By sticking of the viscous parts 63b and 63c of the flat parts 64b and 64c respectively to the back surface 4 thereof, the stick 6f which is inserted into the U-shaped groove of the stick-supporting part 65a is pressed onto the back surface 4 and fixed. One end of the stick 6f protrudes laterally from the side surface 5a thereof.

Figure 25:
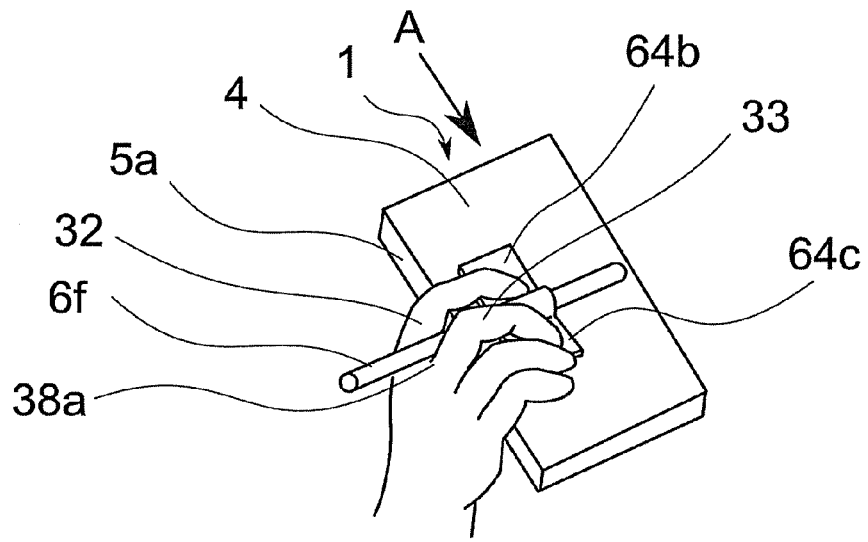
FIG. 25 is a perspective view of the back surface of the eighth embodiment of the present invention.

The method of holding a portable electronic terminal holding tool in hand in this embodiment is the same as the holding methods described in the aforementioned embodiments. FIG. 25 is a perspective view of the back surface in use of the eighth embodiment of the present invention. A stick 6f is placed on the interdigit 38a between forefinger 32 and middle finger 33. The fingertip of the forefinger 32 is on the flat part 64b, while the fingertip of the middle finger 33 is on the flat part 64c. According to the principle of the leverage, the force to the fulcrum is applied on the fingertips of these fingers, and this force press the flat parts 64b and 64c onto the back surface 4 of the portable electronic terminal 1. At the same time, the force also presses the viscous parts 63b and 63c onto the back surface 4 thereof, so that the adhesive strength increases, thus the both flat parts 64b and 64c and the stick 6f are fixed to the portable electronic terminal 1 more firmly.

An advantage of the eighth embodiment is that the stick 6f can be pulled out from the stick-supporting part 65a with certain strength of force because the stick 6f is not fixed with adhesive material and the like, but it is just put in by the stick-supporting part 65a and pressed onto the back surface 4. At the time of stopping use of a portable electronic terminal 1, the stick 6f can be detached by pulling out. The flat parts 64b and 64c, and the stick-supporting part 65a are not so bulky that they cause no inconvenience in carrying the holding tool in a bag even if they are not detached from the portable electronic terminal 1 in the time of no use. It suffices only detaching the stick 6f. Another advantage is this embodiment decreases the danger of dropping a portable electronic terminal from a holding hand even if it is used without the stick 6f, because by applying a high-friction material on the surfaces of the flat parts 64b and 64c, the fingertips of the forefinger 32 and the middle finger 33 placed on the surface of the flat parts 64b and 64c function as preventing a slip of the portable electronic terminal 1.

It is also possible to use a writing tool such as a pencil and an input stylus for the stick 6f. In addition, the stick 6f inserted into the U-shaped groove of the stick-support part 65a is not necessarily of a cylindrical shape. A stick of any shape of a cross-section suffices as long as the fit clearance into the space formed by the back surface 4 and the stick-supporting part 65a is adequate. In short, the function of this embodiment is sufficiently provided even if the fixing is loose as long as the stick does not drop off easily.

Note that when not in use of a portable electronic terminal 1, the flat parts 64b and 64c, and the stick-supporting part 65a can be detached by pulling them slowly from the back surface 4 because the flat parts 64b and 64c, and stick-supporting part 65a are stuck by viscosity. Upon the next use, to press the flat parts 64b and 64c, and the stick-supporting part 65a onto the back surface enables them to be re-attached. Viscous materials suitable for such repeated attachment/detachment are, for example, silicone gel or polyurethane elastomer. They also have a feature of regaining adhesive strength by washing with water. However, these flat parts 64b and 64c and the stick-supporting part 65a are not so bulky that they may remain attached to the portable electronic terminal 1 even when it is not in use. That is, detaching only the stick 6f may suffice in time of no use, and ordinary adhesive material can be applied to the flat parts 64b and 64c for nearly permanent adhesion.

Note that in the configuration described above, it is possible to hold a portable electronic terminal in the same way with the middle finger 33 and the ring finger 34 instead of the forefinger 32 and the middle finger 33. The description is omitted here for the sake of avoiding repetition of the complicated description.

Figure 26:
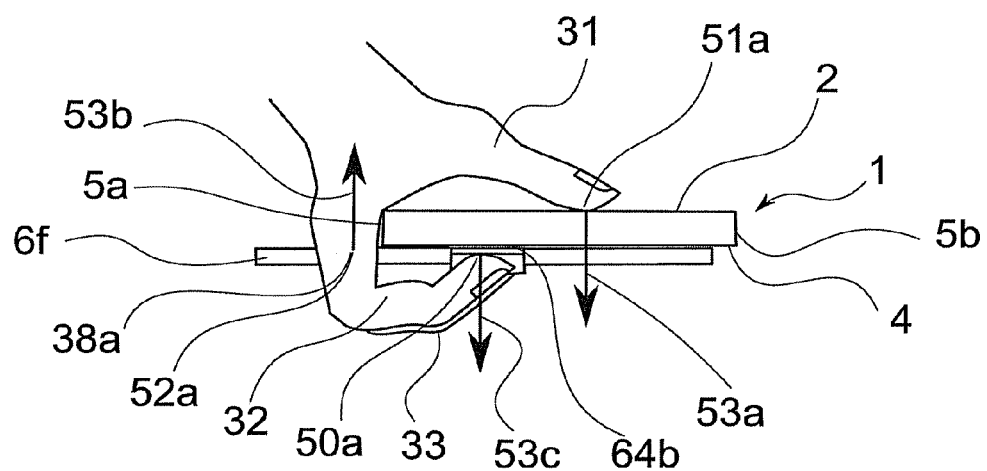
FIG. 26 is an arrow view of the eighth embodiment of the present invention.

FIG. 26 shows an arrow view which is viewed from the direction of an arrow A drawn in FIG. 25 when a portable electronic terminal having this configuration is held in hand. The common parts to the previous embodiments are indicated by the same reference numerals. The portable electronic terminal 1 is held as follows: First, forefinger 32 and middle finger 33 are inserted from the direction of the front surface 2, passing by the side surface 5a of the portable electronic terminal 1, putting the stick 6f between the two fingers. Then, the fingertip of the forefinger 32 is placed on the flat part 64b and the fingertip of the middle finger 33 are placed on the flat part 64c (not shown in FIG. 26). Since the flat parts 64b and 64c contact the back surface 4 of the portable electronic terminal 1, the fingertips of the forefinger 32 and the middle finger 33 hold the back surface 4 thereof, indirectly placed on the back surface 4. Note that in normal use of a portable electronic terminal 1, the front surface 2 faces upward (i.e. facing the sky) and the back surface 4 faces downward (facing the ground). The description of the present embodiment is based on this normal use. Unless otherwise specified, descriptions of other embodiments follow the same.

In such situation, when thumb 31 taps a part close to a side surface 5b of a display part 3 (not shown in the figures) which is on the front surface 2 of a portable electronic terminal 1, the tapped point functions as a point of effort 51a of the principle of leverage, applying a downward vector force 53a to the portable electric terminal 1 (Note that the vector arrow in the figures represents only a starting point and a direction, but not the magnitude of the force by the line length. The same shall apply hereafter). At this time, the fingertips of the forefinger 32 and the middle finger 33 becomes a fulcrum 50a, a moment of force of clockwise rotation is applied, causing the portable electronic terminal 1 to drop off the holding hand. However, at this time, the protruding part of the stick 6f which receives the same moment of force pushes the interdigit 38a between the forefinger 32 and the middle finger 33. The interdigit 38a functions as a point of load 52a, thus receives upward vector force 53b applied to the interdigit 38a and stops the force. In this manner, the forces are balancing according to the principle of the leverage with the fingertip of the thumb 31 as a point of effort, the fingertips of other fingers as a fulcrum, and the interdigit 38a between fingers as a point of load. This balancing of forces prevents the portable electronic terminal 1 from dropping off the hand. In this case, downward vector force 53c is applied on the fingertips of the fingers which function as fulcrum 50a.

The flat parts 64b and 64c are directly, and the stick 6f is indirectly, pressed onto the back surface 4 of the portable electronic terminal 1 by the fingertips of the forefinger 32 and the middle finger 33, and those parts are fixed by static friction force. Therefore, without the viscous parts 63b and 63c (not shown in the figure), the portable electronic terminal 1 does not drop from the hand caused by slip-off of the flat parts 64b and 64c and the stick 6f.

If the contacting length of the stick 6*f* in contact with the back surface 4 of the portable electronic terminal 1 is extremely short, upon pressing the front surface 2 with the thumb 31, the fulcrum in the principle of the leverage moves from the fingertip of the forefinger 32 to the end of the stick 6*f* attached to the back surface 4. This causes a force to detach the stick 6*f* at a part close to the side surface 5*a* from the back surface 4. Then, fixation of the stick 6*f* becomes unstable. Therefore, the longer stick 6*f* is the better to fixed firmly.

Figure 27:
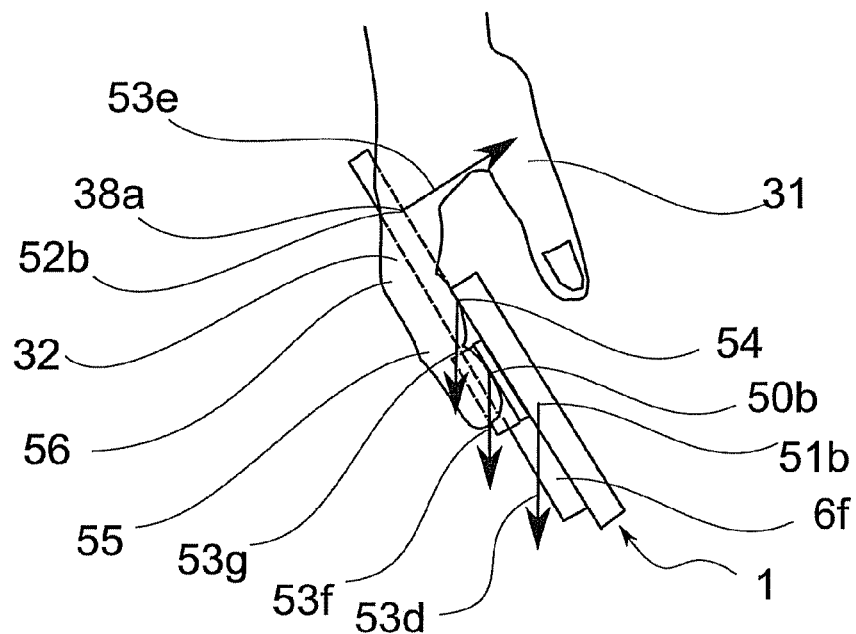
FIG. 27 is another arrow view of the eighth embodiment of the present invention.

FIG. 27 is another arrow view of the eighth embodiment of the present invention. The common parts to the previous embodiments are indicated by the same reference numerals in the figure. This is an illustration with an arrow viewed from the direction of arrow A described in FIG. 25 when thumb 31 is apart from the front surface 2 and almost all force is relieved from other fingers. The portable electronic terminal 1 is placed on the relaxed fingers. In this case, vector force 53*d* represents the weight of the portable electronic terminal 1. And vector force 53*d* is applied to the point of effort 51*b* which is approximately the center thereof. It is apparent that the portable electronic terminal 1 will slip off from the hand if there is no portable electronic terminal holding tool.

However, the portable electronic terminal 1 with the holding tool never drops. The reason is explained as follows. When dropping force is applied to a point of effort 51*b*, the fingertips of the forefinger 32 and the middle finger 33 serve as fulcrum 50*b*, and the interdigit 38*a* between the two fingers serves as point of load 52*b* according to the similar mechanism to the principle of the leverage explained in FIG. 25. Thus vector force 53*e* works onto the hand. vector force 53*f* is also works onto the fingertip of the forefinger 32. In this situation, since the fingers are relaxed. Due to the stress of each vector force described above, the bent forefinger 32 is straightened to a little extent. The inner finger surface 54 between the first knuckle joint 55 and the second knuckle joint 56 of the forefinger 32 is pressed onto the back surface 4 of the portable electronic terminal 1. Hence, vector force 53*g* is applied to the fingers. As for the middle finger 33, the same situation occurs. The vector force on the relaxed fingers serves as force which will open the grasping fingers and stretch the bent fingers. However, since the stick 6*f* is placed on the interdigit 38*a* between the forefinger 32 and the middle finger 33, it prevents these fingers from opening and stretching more. Therefore, the aforesaid vector forces are maintained. The portable electronic terminal 1 does not drop from the hand due to static friction force provided by stress force of fingers and the portable electronic terminal 1 and the stick 6*f*. In other words, the portable electronic terminal 1 is held securely, not dropping from the hand even if the fingers release almost all force and are relaxed.

Figure 28:
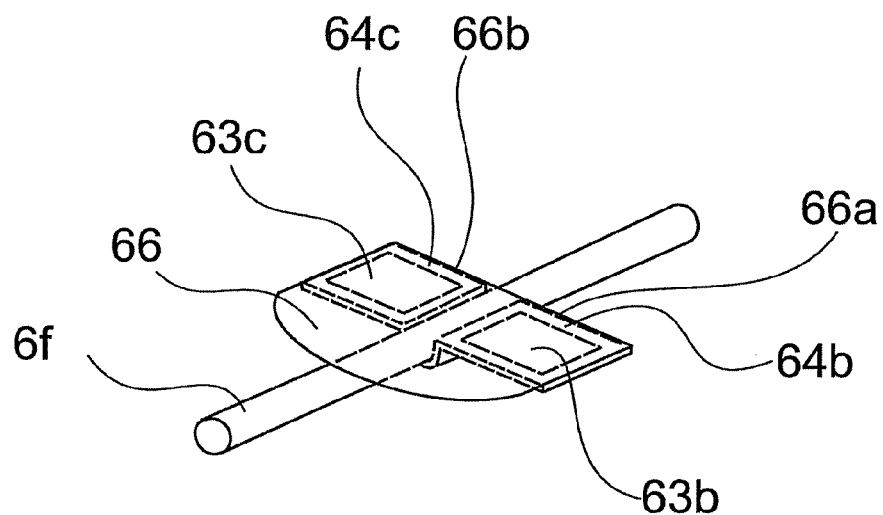
FIG. 28 is the second perspective view of the eighth embodiment of the present invention.
Figure 29:
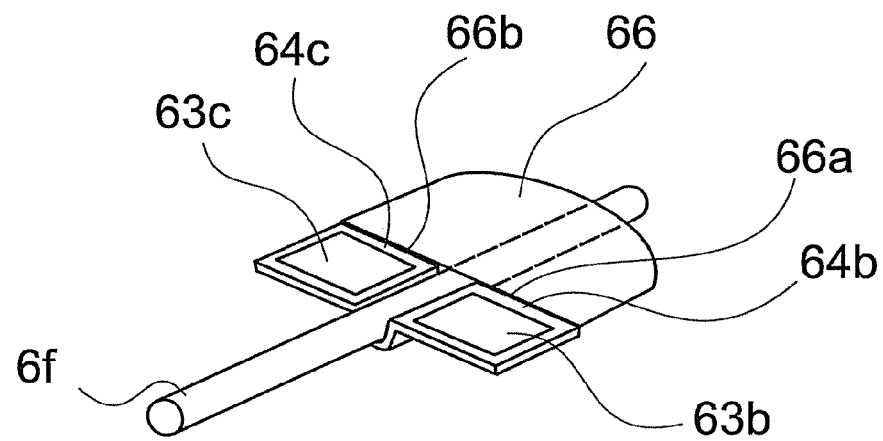
FIG. 29 is the third perspective view of the eighth embodiment of the present invention.

Referring to FIGS. 28 and 29, will be described an additional configuration of the eighth embodiment. FIG. 28 is the second perspective view of the eighth embodiment of the present invention. The difference from FIG. 24 is addition of a thin plastic cover sheet 66.

The exposed viscous parts 63*b* and 63*c* is easy to stick to things around them when the holding tool is detached to the portable electronic terminal 1. Also, the adhesive strength is weakened by dust sticking to viscous parts, thus, it is preferable that the viscous parts 63*b* and 63*c* should be covered. For this purpose, the surfaces of the viscous parts 63*b* and 63*c* are covered with a cover sheet 66. The end 66*a* of the cover sheet 66 is connected to the end of the flat part 64*b*, and able to rotate with the linear connecting part as its axis. Similarly, the end 66*b* of the cover sheet 66 is connected linearly to the end of the flat part 64*c*, and able to rotate with the linear connecting part as its axis. To the surface of the cover sheet 66 which contacts the viscous parts 63*b* and 63*c*, is applied silicone lubricant to detach the viscous parts 63*b* and 63*c* easily.

FIG. 29 is the third perspective view of the eighth embodiment of the present invention. As seen in FIG. 29, upon using the holding tool, the cover sheet 66 is opened by rotating 180 degrees with its ends 66*a* and 66*b* as the axis to expose the viscous parts 63*b* and 63*c*. The holding tool of this embodiment is attached to the portable electronic terminal 1 in this state. That is, the viscous parts 63*b* and 63*c* are stuck to the back surface 4 (not shown in FIG. 29), and then the cover sheet 66 is placed on the back surface 4 closely without hanging, put between the back surface 4 and the stick 6*f*.

As described above, to employ the cover sheet 66 as an additional configuration prevents adhesion of dust when the portable electronic terminal 1 is not in use, and at the same time, it is not bulky when is use. In general cases, adhesive objects shall be covered when they are not used. Those general covers are lone object separated from adhesive objects. Then storing the covers is troublesome or the covers are lost easily. However, in the said configuration, the cover sheet is connected to the holding tool. It eliminates the possibility of being lost and can be stored not in bulky shape as described above.

Embodiment 9

Figure 30:
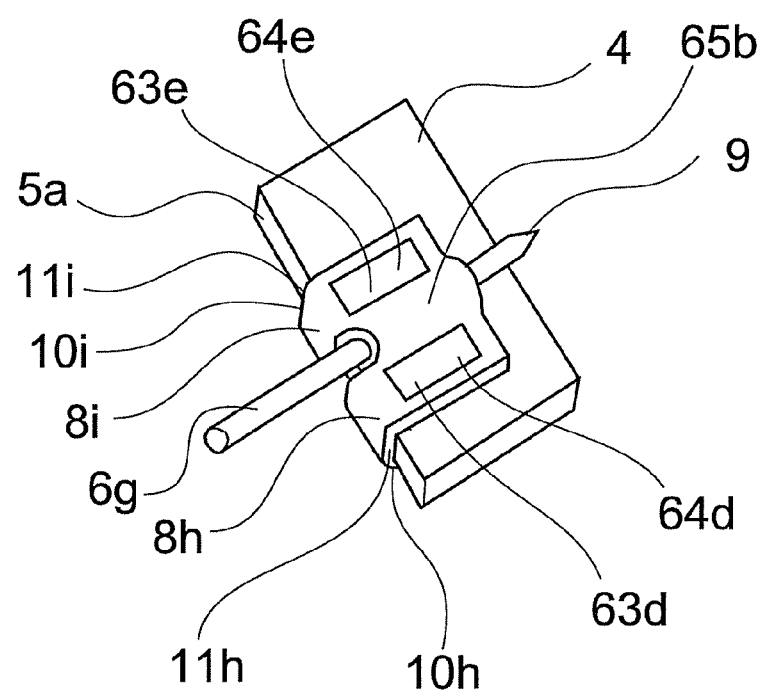
FIG. 30 is a perspective view of the back surface of the ninth embodiment of the present invention.

Referring to FIG. 30, will be described the ninth embodiment of the present invention. FIG. 30 is a perspective view of the back surface of the ninth embodiment of the present invention. The common parts to the previous embodiments are indicated by the same reference numerals in the figure. The flat parts 64*d* and 64*e* are adhered to the back surface 4 by viscous parts 63*d* and 63*e* adhered to the back surface 4. A stick-supporting part 65*b* between the flat parts 64*d* and 64*e* is elastic and connects to these flat parts 64*d* and 64*e*. It fixes a stick 6*g* put between the stick-supporting part 65*b* and the back surface 4 by its shrinking force. One end of the stick 6*g* protrudes laterally from a side surface 5*a*. The stick 6*g* is a pencil, and its nib 9 is inserted through the space between the stick-supporting part 65*b* and the back surface 4, and protrudes from the other side of the stick-supporting part 65*b*. The pinching part 8*h* connected to the flat part 64*d* has a hook 10*h* and a receiving part 11*h*. In the same manner, the pinching part 8*i* connected to the flat part 64*e* has a hook 10*i* and a receiving part 11*i*. The receiving parts 11*h* and 11*i* are elastic, slightly stretched along the side surface 5*a* of the portable electronic terminal 1 while the hooks 10*h* and 10*i* are hooked to the edges of the front surface 2 thereof (not shown in FIG. 30). The hooks 10*h* and 10*i* pinch the portable electronic terminal 1 firmly by shrinking force of the receiving parts 11*h* and 11*i*.

The method of holding a portable electronic terminal 1 of this embodiment in hand is the same as described in each of the previous embodiments. An advantage of the ninth embodiment is a possible use of variety of writing tools or an input stylus for the stick 6*g*. Also, another advantage of this method is strengthening adhesive force and resulting firm hold of the stick 6*g*. This is because when the stick 6*g* is supported at the interdigit between forefinger and middle finger, the fingertips of these fingers touch the flat parts 64*e* and 64*d*. According to the principle of the leverage, these fingertips provide with force to press the flat parts 64*d* and 64*e* onto the back surface 4 of the portable electronic terminal 1. Thus the fixation of the stick 6g becomes secure due to the increase of the adhesive force of the viscous parts 63d and 63e.

The effect is, of course, the same when the stick 6g is held on the interdigit between middle finger and ring finger.

Note that when the portable electronic terminal 1 is not used, the holding tool can be detached completely as follows: First, the stick 6g is pulled out, then the hooks 10h and 10i are unhooked. When the hooks 10h and 10i and the receiving parts 11h and 11i are slowly pushed down from the back surface 4, the viscous parts 63d and 63e also slowly detached from the back surface 4. Thus, the whole of the holding tool is detached from the portable electronic terminal 1. However, the flat parts and the pinching parts attached to the portable electronic terminal 1 are not so bulky that they do not cause inconvenience for carrying the portable terminal in a bag even if they are not detached when not in use; it suffices to detach only the stick 6g. Also, this embodiment has another advantage that if a material of large friction is employed to the outer surfaces of the flat parts 64d and 64e, it prevents slip off
from a hand, thus, reduces the risk of dropping the portable electronic terminal 1 from a hand even when held without the stick 6g.

Embodiment 10

Figure 31:
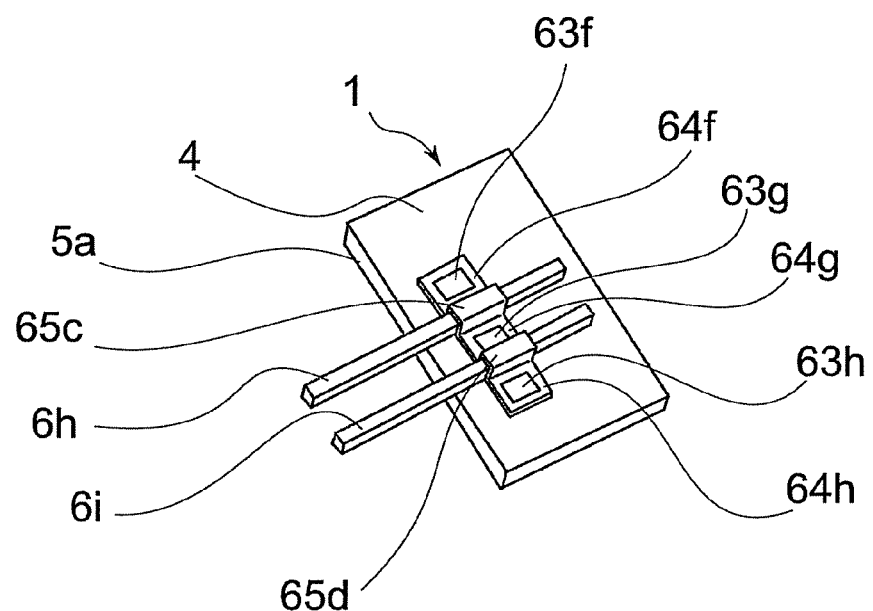
FIG. 31 is a perspective view of the back surface of the tenth embodiment of the present invention.
Figure 32:
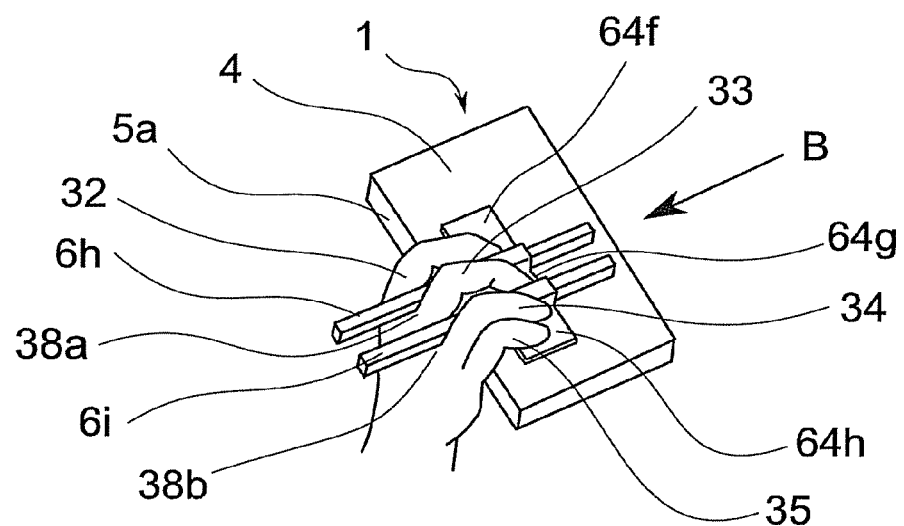
FIG. 32 is a perspective view of the back surface in use of the tenth embodiment of the present invention.

Referring to FIGS. 31 and 32, will be described the tenth embodiment. FIG. 31 is a perspective view of the back surface of the tenth embodiment of the present invention. In FIG. 31, two parallel sticks 6h and 6i protrude laterally from a side surface 5a of a portable electronic terminal 1. The stick 6h is a square pole and held in a stick-supporting part 65c having a U-shaped cross section which is between flat parts 64f and 64g, while the stick 6i is a square pole and held in a stick-supporting part 65d having a U-shaped cross section which is between flat parts 64g and 64h. The flat part 64f, the stick-supporting part 65c, the flat part 64g, the stick-supporting part 65d, and the flat part 64h are from a single plate which is formed to have two U-shaped grooves. An viscous part 63f is pasted on the flat part 64. an viscous part 63g is pasted on the flat part 64g. And an viscous part 63h is pasted on the flat part 64h. These viscous parts 63f, 63g, and 63h are on the same plane. Also, one side of the stick 6h and one side of the stick 6i are on the same level of this plane. When the viscous parts 63f, 63g, and 63h are stuck to the back surface 4 of a portable electronic terminal 1, the flat parts 64f, 64g, and 64h are adhered to the back surface 4, too. At the same time, the sticks 6h and 6i are pressed by the stick-supporting parts 65c and 65d respectively, so that the sticks 6h and 6i are fixed on the back surface 4. The sticks 6h and 6i are in a parallel position of 2 cm interval. One end of each of the sticks 6h and 6i protrudes 4 cm from the side surface 5a of the portable electronic terminal 1.

FIG. 32 is a perspective view of the back surface in use of the tenth embodiment of the present invention. The common parts to the previous embodiments are indicated by the same reference numerals in FIG. 32. The portable electronic terminal 1 is held as follows. First, forefinger 32 is inserted from the direction of the front surface 2 (not shown in FIG. 32) passing by the side surface 5a of the portable electronic terminal 1 to reach the back surface 4, and its fingertip is placed on the flat part 64f on the back surface 4. Second, in order to put the stick 6h between the forefinger 32 and the middle finger 33, middle finger 33 is inserted from the direction of the front surface 2 (not shown in FIG. 32) passing by the side surface 5a to reach the back surface 4, and its fingertip is placed on the flat part 64g on the back surface 4. Then, in order to put the stick 6i between the middle finger 33 and the ring finger 34, ring finger 34 is also inserted from the direction of the front surface 2 (not shown in FIG. 32) passing by the side surface 5a to reach the back surface 4, and its fingertip is placed on the flat part 64h on the back surface 4. little finger 35 needs not to be placed at a specific place. Upon holding this way, the stick 6h is on the interdigit 38a between the forefinger 32 and the middle finger 33, while the stick 6i is on the interdigit 38b between the middle finger 33 and the ring finger 34.

In the said holding state, upon tapping on a display part 3 (not shown in FIG. 32) with thumb 31 (not shown in FIG. 32), the tapped part functions as a point of effort of leverage, the fingertips of the forefinger 32, the middle finger 33, and the ring finger 34 as a fulcrum, and the interdigits 38a and 38b as points of load. Then, the force balances according to the principle of the leverage, and the portable electronic terminal 1 is held securely without dropping from the hand.

An advantage of this holding method is that it allows dispersion of the force. The force applied to each fingertip is reduced to two-thirds when the number of fingers which hold a portable electronic terminal increases from two to three. Also, the force working on each interdigit is reduced to half when the number of interdigits to support the sticks increases from one to two. Although the total of the force in the principle of the leverage is the same, the force applied onto each point reduces as described above, thus, pressure to the fingers or their fatigue are reduced.

Figure 33:
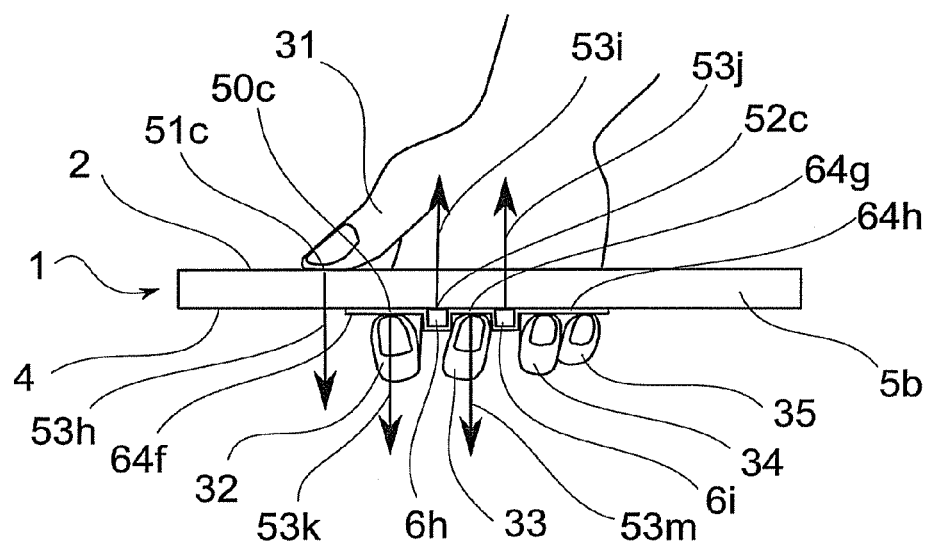
FIG. 33 is an arrow view of the tenth embodiment of the present invention.

FIG. 33 is an arrow view of the tenth embodiment of the present invention. It is a view seen from the direction of an arrow B in FIG. 32. In the previous embodiments, illustrations were provided in the drawings which showed the direction of an arrow A, that is, view of a user of a portable electronic terminal seen from the front. On the other hand, FIG. 33 changes the angle of the view by 90 degrees, showing a view from the direction of an arrow B, a view of a user seen from his left side in order to explain the principle of the leverage from different aspects. The common parts to the previous embodiments are indicated by the same reference numerals in FIG. 33. In the drawing, the side surface 5b of a portable electronic terminal 1 is the front of the drawing. The hand-holding method is the same as described in FIG. 32.

Upon tapping with thumb 31 on the edge of the display part 3 (not shown in FIG. 33) on the front surface 2 of a portable electronic terminal 1, that tapped point functions as a point of effort 51c, and vector force 53h is applied to the portable electronic terminal 1. The fingertip of forefinger 32 functions as a fulcrum 50c. The vector force 53h is transmitted to the stick 6h, and vector force 53i is applied to the interdigit 38a (not shown in FIG. 33) between the forefinger 32 and the middle finger 33 functioning as a point of load 52c. Downward vector force 53k is also applied to the fingertip of the forefinger 32 which functions as a fulcrum 50c. Then the forces are balanced in this way, so that the portable electronic terminal 1 does not drop off a hand.

Moreover, since the present embodiment employs a stick 6i in addition to the stick 6h, the force onto the interdigit is dispersed to the interdigit 38a, and as a vector force 53j to the interdigit 38b between the middle finger 33 and the ring finger 34 where the stick 6i is put. Similarly, the force on the fingertip of the forefinger 32 functioning as a fulcrum is shared with the fingertip of the middle finger 33 placed on the flat part 64g. In that way, employing the two sticks allows the applied force to be dispersed, and it decreases the pressure. Thus holding a portable electronic terminal becomes easier. Without sticks of the holding tool, the portable electronic terminal would rotate counterclockwise and drop from the hand upon tapping on a display part 3 because the portable electronic terminal 1 does not have a point of load to receive the stress.

The above embodiment does not use little finger 35. However, holding the stick between the little finger 35 and other fingers also provides secure hold of a portable electronic terminal 1. That is, holding the two sticks with the middle finger 33, the ring finger 34 and the little finger 35, instead of using the forefinger 32. The detailed description is as follows, though not shown by a drawing: First, the middle finger 33 is put on the back surface 4 of the portable electronic terminal 1 inserted from the direction of the front surface 2 passed by the side surface 5*a*, and the fingertip of the middle finger 33 is placed on the flat part 64*f* of the back surface 4. Then, in order to put the stick 6*h* between the middle finger 33 and the ring finger 34, the fingertip of the ring finger 34 is placed on the flat part 64*g* on the back surface 4 of the portable electronic terminal 1, passed by the side surface 5*a*. Also, in order to put the stick 6*i* between the ring finger 34 and the little finger 35, the fingertip of the little finger 35 is placed on the flat part 64*h* on the back surface 4, passing by the side surface 5*a*. Holding the portable electronic terminal 1 in this way enables the stick 6*h* to be put on the interdigit 38*b* between the middle finger 33 and the ring finger 34, and the stick 6*i* to be put on the interdigit 38*c* between the ring finger 34 and the little finger 35.

An advantage of this holding way is that it allows not only the thumb 31 which has high flexibility but also allows the forefinger 32 to be used freely. The forefinger 32 with such flexibility can touch the front surface 2 as well as the back surface 4 of the portable electronic terminal 1. Since it is possible to use both thumb 31 and forefinger 32 for input on the display part 3, it allows more complicated input actions such as pinch-in, i.e. pinching on the screen with two fingers for zoom-out, and pinching out, i.e. widening between two fingers for zoom-in.

Note that the two parallel, protruding sticks are not limited to being adhered to the back surface, though the present embodiment comprises two sticks adhered to the back surface. For example, fixing the bases of the two sticks by inserting them into screw holes provided on the side surface bring the same configuration, functions and effects the present invention intends. Moreover, using a U-shaped stick which is made by bending part of a long stick provides the same configuration, functions and effects as long as the stick has two protruding part from a side surface of a portable electronic terminal.

Figure 34:
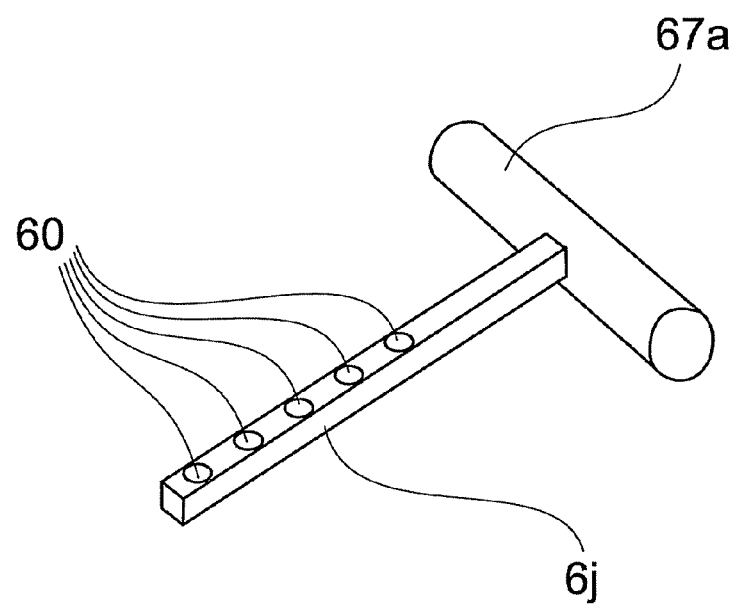
FIG. 34 is a perspective view of the eleventh embodiment of the present invention.
Figure 35:
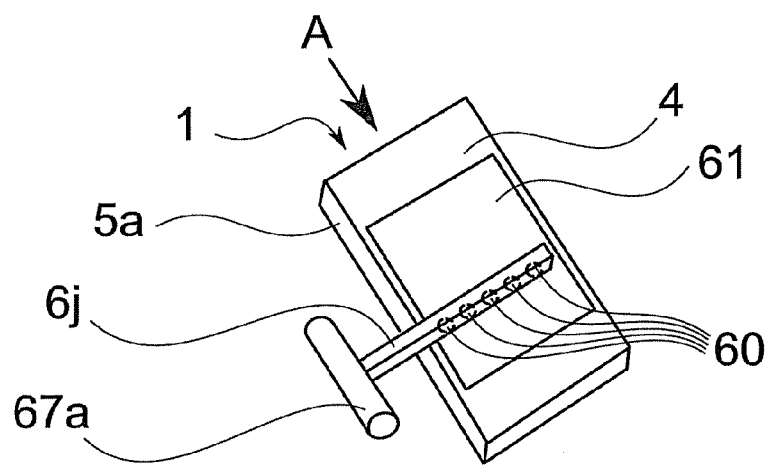
FIG. 35 is a perspective view of the back surface of the eleventh embodiment of the present invention.
Figure 36:
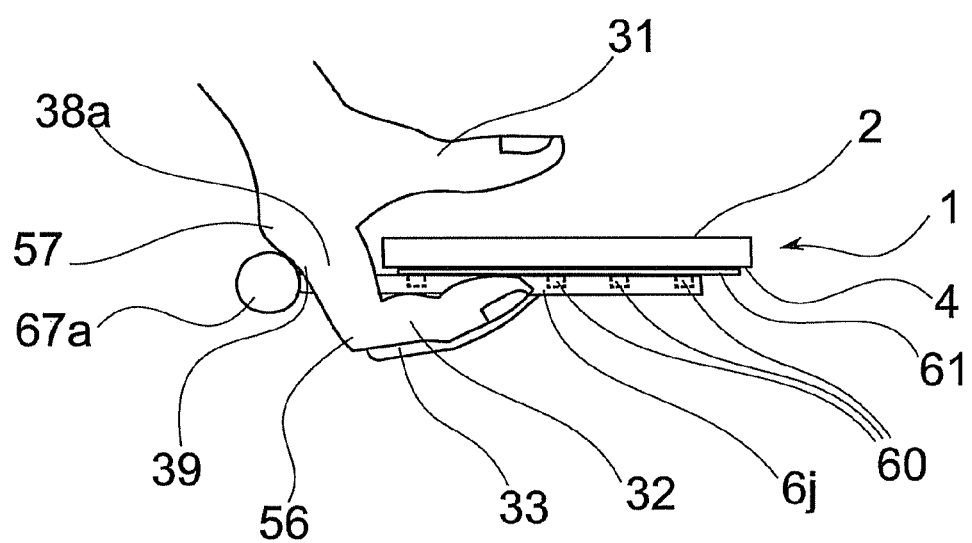
FIG. 36 is an arrow view of the eleventh embodiment of the present invention.

Referring to FIGS. 34 to 36, will be described the eleventh embodiment of the present invention. FIG. 34 is a perspective view of the eleventh embodiment of the present invention. A square pole stick 6*j* with 5 mm-width and 5 mm-thickness has five magnets 60 embedded on one side. One end of the stick 6*j* is joined to the middle of a cylindrical back pad 67*a* almost vertically. The back pad 67*a* is approximately 6 cm long, and the length from the joined point by the stick 6*j* to each end of the back pad 67*a* is 3 cm. FIG. 35 shows the stick 6*j* having the back pad 67*a* attached to a portable electronic terminal 1. FIG. 35 is a perspective view of the back surface of the eleventh embodiment of the present invention. The stick 6*j* is fixed when the magnets 60 are stuck by magnetic force to a sheet iron 61 which is adhered to the back surface 4 thereof. The joined end of the stick 6*j* to the back pad 67*a* protrudes laterally from the side surface thereof. The side surface 5*a* and the back pad 67*a* are approximately in parallel with about 2 cm gap. The position of a hand holding this holding tool is the same as that of the previous embodiments. FIG. 36 is an illustration with an arrow of the eleventh embodiment. It shows the potable electronic terminal 1 with a magnetically fixed holding tool by magnets 60 in right hand viewed from the direction of an arrow A in FIG. 35. It is held as follows: First, the forefinger 32 and the middle finger 33 are slid to the holding tool from the direction of front surface 2 of the portable electronic terminal 1 so that the stick 6*j* may be put between the forefinger 32 and the middle finger 33, while the fingertips of the two fingers reach the back surface 4. Note that it is assumed that in the normal use the front surface 2 faces upward (facing the sky) and the back surface 4 faces downward (facing the ground). The illustration of the present embodiment is also based on the normal use.

When the thumb 31 is apart from the front surface 2 without tapping the front surface 2, the entire hand is tilted slightly to the direction of the back of the hand, and the backs of the fingers 39 touch a back pad 67*a* whose position is parallel to the side surface 5*a*. This leads to backs of the fingers' 39 pushing the back pad 67*a*, and the force balances in this state. The force which the backs of the fingers 39 receive from the back pad 67*a* is the force which should be received at the interdigit 38*a* if there is not a back pad 67*a*. That means that the back pad 67*a* divides the force which would be applied to the interdigit 38*a* functioning as a fulcrum in the principle of the leverage, or the back pad 67*a* substitutes for the interdigit 38*a*. Then, in the situation where the thumb 31 is off from the front surface 2, the portable electronic terminal 1 is securely held without dropping from the hand. This is because the forces balance according to the principle of the leverage while the gravity center (not shown in the figure) existing in the middle of the portable electronic terminal 1 functions as point of effort, the fingertips of the forefinger 32 and the middle finger 33 function as a fulcrum, and the backs of the fingers 39 touching the back pad 67*a* and the interdigit 38*a* contacting the stick 6*j* function as a point of load. Thus, the portable electronic terminal 1 is securely held without dropping even if the thumb 31 is off from the front surface 2. Of course, when input is provided by the thumb 31 tapping on the front surface 2, the fingertip of the thumb 31 functions as a point of effort, the fingertips of the forefinger 32 and the middle finger 33 as a fulcrum, and the backs of the fingers 39 and the interdigit 38*a* as point of load, so that the forces balance and the portable electronic terminal 1 is securely held.

In general, in use of a portable electronic terminal such as a tablet-type terminal, input is provided not all the time. Considerable time is spent only for watching the display part 3 (not shown in the figure). It is well assumed that in the normal use, the time of watching the display part 3 is longer than that of providing input. While watching the display part 3, the thumb 31 shall not touch the display part 3 in order to avoid unnecessary input. However, normally, when the thumb 31 is off from the front surface 2 and if other four fingers do not support the gravity center, i.e. approximately the middle of the tablet-type terminal from the back surface, the portable electronic terminal 1 drops off the hand. To prevent its dropping, even in time of no input, the thumb 31 needs to press a narrow edge beside the display part 3 on the front surface 2, and hold the portable electronic terminal 1 securely with other fingers which support from the back surface 4.

Compared such a normal way of holding, the present embodiment has an advantage that the portable electronic terminal 1 is securely held without a risk of dropping even when the thumb 31 is off from the front surface 2 or even when other four fingers do not support the center of the portable electronic terminal 1 from the back surface 4. The advantage of preventing drop of the present invention is not limited to the eleventh embodiment. All the previous embodiments similarly prevent a portable electronic terminal from dropping off a hand. Just as mentioned above, this is because the present invention utilizes the principle of the leverage with the gravity center there of as point of effort. In each embodiment which does not have a back pad 67a, only an interdigit 38a (or an interdigit 38b) functions as a point of load, and receives more force as the number of points of load is decreased.

Note that it is preferable that a part of the hand which touches the back pad 67a should be the backs of the fingers between the second knuckle joint 56 and the third knuckle joint 57. Different structure is also possible which a part on the back of a hand close to a wrist touches the back pad 67a, and it ensures holding based on the principle of the leverage, too. However, in that case, the stick 6j needs to be longer and the back pad 67a to be larger size, resulting in the increase of a holding tool in size.

In this embodiment, the length of the protruding part of the stick 6j from the side surface 5a of a portable electronic terminal 1 is about 2 cm. On the other hand, in other embodiments which do not employ a back pad, the length of the protruding part of the stick must be longer than that, about 4 cm long. The difference is caused by the difference in parts receiving the force. In the embodiments having a simple stick without a back pad, only the interdigit receives force. Seeing the detail of the position of the interdigit with reference to the forefinger 32, the middle finger 33 and the ring finger 34, the interdigit area which receives force is the part from the part on the palm where fingers separate to the point between third knuckle joints of the fingers on the back of the hand. It is approximately at least 4 cm long for an adult male and at least about 3 cm for an adult female. The stick preferably contacts the entire of this part. If a stick is so short that it only reaches the middle of the interdigit, the end of the stick bites a part of the interdigit, causing pain. That means the length of the stick must be at least about 4 cm for an adult male and at least about 3 cm for an adult female upon holding the portable terminal without pain. On the other hand, in the case just as this embodiment which has a back pad, not the entire interdigit area needs to receive the stick. The force from the stick also reaches the back pad, being dispersed onto the backs of fingers and the interdigit. Even when the force is received only by the backs of the fingers, the functions and the effects are the same. Rather, the back of the fingers can receive the force more easily because the bones are close to the surface skin on the back side of the fingers. In this way, if the backs of the fingers mainly receive force, the interdigit of fingers has little need to function, and it suffices that fingers are merely inserted between the side surface 5a and the back pad 67a. Therefore, the stick needs to provide space of only about 2 cm gap which is equivalent to the thickness of four fingers except thumb. According to this, the stick in the present embodiment is 2 cm long.

When the stick 6j is pulled with force from a portable electronic terminal 1 in no use thereof, a plurality of magnets 60 magnetically adhered to a sheet iron 61 are detached from the sheet iron 61. The sheet iron 61 itself remains attached to the back surface 4 in time of no use thereof. However, the sheet iron 61 remaining on the back surface 4 is not obstructive, and hardly causes inconvenience for storing of the potable electronic terminal 1 or for carrying it. Only the stick 6j having a plurality of magnets 60 and back pad 67a shall be attached/detached in case of use/no use of a portable electronic terminal.

Note that in this embodiment the holding tool is intended to be detached when not in use of a portable electronic terminal 1. However, the holding tools of the present invention are not limited to be used with attachment/detachment. For example, the sticks may be pushed in to be stored into a storage space inside the portable electronic terminal 1 when not in use. Or, for example, the stick can be configured to allow the protruding part to be folded up by 180-degree turning. In short, the present invention can achieve its functions if the stick and the back pad have rigidity enough to receive the force and maintain their positions when in use.

Embodiment 12

Figure 37:
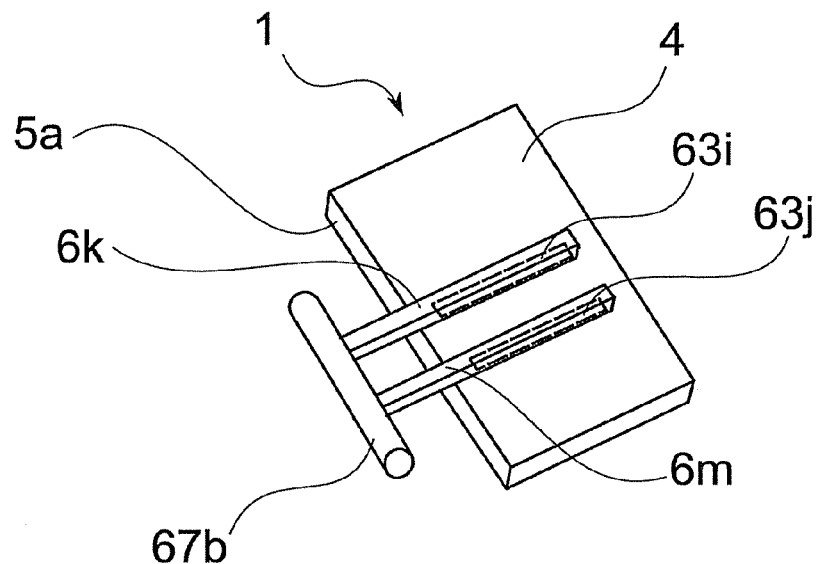
FIG. 37 is a perspective view of the twelfth embodiment of the present invention.

Referring to FIG. 37, will be described the twelfth embodiment of the present invention. FIG. 37 is a perspective view of the back surface of the twelfth embodiment of the present invention. The common parts to the previous embodiments are indicated by the same reference numerals in the figure. Two square pole sticks 6k and 6m whose bases have 5 mm width and 5 mm thickness sides are placed in parallel with about 2 cm gap. One end of each stick is fixed and adhered to a cylindrical back pad 67b almost vertically. The entire length of the back pad 67b is 8 cm, with each end protruding 3 cm from the stick 6k and protruding 3 cm from the stick 6m. The stick 6k has an viscous part 63i on its one side and the stick 6m has an viscous part 63j on its one side. These viscous parts 63i and 63j are adhered to the back surface 4 of the portable electronic terminal 1 by their adhesive force, thus, the sticks 6k and 6m are fixed on the back surface 4, and the other ends of the two sticks 6k and 6m adhered to the back pad 67b protrude from the side surface 5a. The side surface 5a and the back pad 67b are positioned approximately in parallel with about 2 cm gap.

The holding method by a portable electronic terminal holding tool in this configuration is almost the same as illustrated in the tenth embodiment. The way of the hold is as follows: First, the forefinger 32 (all the fingers are not shown in the figure) is inserted passing by the side surface 5a from the direction of the front surface 2 (not shown in the figure) of a portable electronic terminal 1 to the direction of the back surface 4 until the fingertip of the forefinger 32 touches the back surface 4. Second, the middle finger 33 is inserted passing by the side surface 5a from the direction of the front surface 2 (not shown in the figure) thereof to the direction of the back surface 4 until its fingertip touches the back surface 4 so that the stick 6k can be put between the forefinger 32 and the middle finger 33. Then, the ring finger 34 is inserted passing by the side surface 5a from the direction of the front surface 2 (not shown in the figure) thereof to the direction of the back surface 4 until its fingertip touches the back surface 4 so that the stick 6m can be put between the middle finger 33 and the ring finger 34. In this way of holding, the stick 6k is put on the interdigit 38a between the forefinger 32 and the middle finger 33, while the stick 6m is put on the interdigit 38b between the middle finger 33 and the ring finger 34, and the backs of the forefinger 32, middle finger 33 and the ring finger 34 touch the back pad 67b.

In this state of holding, upon tapping a display part 3 (not shown in the figure) with thumb 31 (not shown in the figure), the tapped point functions as a point of effort, fingertips of the forefinger 32 and the middle finger 33 and the ring finger 34 function as fulcrum, and the two interdigits 38a and 38b and backs of the fingers 39 function as point of load, so that the forces balance according to the principle of the leverage. An advantage of this way of holding is that the forces can be divided. The force applied on each finger tip reduces to the two-thirds of the original as the number of fingertips increases from two to three. The force applied to each of the points of load is considerably reduced as the number of the interdigit increases from one to two. And the backs of the fingers 39 also is added as a point of load. Although the total of the forces in the principle of the leverage is the same, the force applied to each point is reduced, so that the stress onto the fingers in holding and the fatigue of the fingers are reduced.

Moreover, even if the thumb 31 becomes off from the front surface 2, the portable electronic terminal 1 does not drop from the hand the same as described in the eleventh embodiment. Furthermore, since the forces onto each fingertip is considerably reduced, the oppression to the fingers and the fatigue of the fingers in holding are also reduced. If a portable electronic terminal 1 is an e-book, most of the time input is provided. Thus, holding easily in this way for a long time with the thumb relieved off from the front surface 2 is very favorable advantage.

In this embodiment, it has been described that the distance between the parallel sticks 6k and 6m is about 2 cm between which a finger is inserted. However, even if the distance between the two sticks is expanded and more fingers are inserted, it is possible to hold the portable terminal in the same way. For example, it is possible to hold a portable electronic terminal 1 with a holding tool which has two sticks 6k and 6m with 8 cm interval, and four fingers, the forefinger 32, the middle finger 33, the ring finger 34, and the little finger 35, are inserted between the sticks at the same time; The four fingers are inserted from the direction of the front surface 2 of a portable electronic terminal 1 to the direction of the back surface 4, to the space between the sticks 6k and 6m and the back pad 67b, passing by the side surface 5a until the four fingertips touch the back surface 4. The backs of these four fingers touch the back pad 67b. Upon tapping a display part 31 (not shown in the figure) with thumb 31 in this state, the forces balance according to the principle of the leverage, with the tapped point functioning as a point of effort, the fingertips of forefinger 32, the middle finger 33, the ring finger 34, and the little finger 35 functioning as a fulcrum, the backs of the four fingers functioning as points of load. As a result, it prevents a portable electronic terminal 1 from dropping off the hand. In this case, an interdigit is not needed. Holding with many fingers in this way allows secure holding.

Embodiment 13

Figure 38:
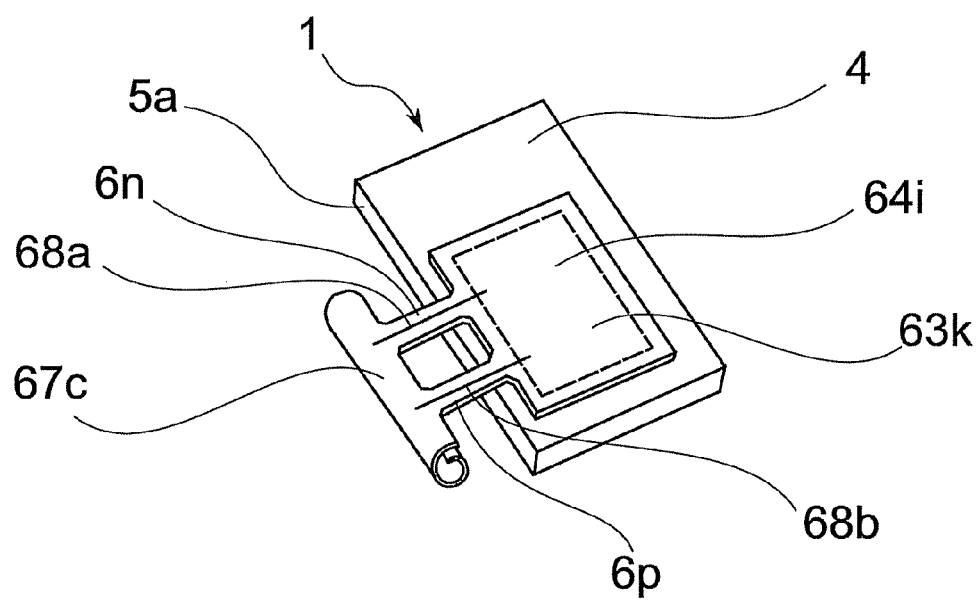
FIG. 38 is a perspective view of the thirteenth embodiment of the present invention.

Referring to FIG. 38, will be described the thirteenth embodiment of a portable electronic terminal holding tool. FIG. 37 is a perspective view of the back surface of the thirteenth embodiment of the present invention. The common parts to the previous embodiments are indicated by the same reference numerals in the figure. An viscous part 63k sticks to one side of the flat part 64i. Two sticks 6p and 6n expand in parallel with 2 cm interval from a side of the flat part 64i. The two sticks 6p and 6n are on the same plane as that of the flat part. One end of each of the sticks 6n and 6p is joined to the back pad 67c.

The flat part 64i, the sticks 6n and 6p, and the back pad 67c form an monolithic structure, being made of one sheet of stainless steel. The 0.3 mm-thick stainless steel plate is stamped out to desired shapes, then the back pad 67c is made by rounding a stamped-out part to a cylindrical shape. Press-formed grooves 68a and 68b are made in the middle of the sticks 6n and 6p respectively by press forming, which allows the sticks to be difficult to bend and highly rigid. Upon use of a portable electronic terminal 1, an viscous part 63k on the flat part 64i is adhered to the back surface 4 thereof. The ends of the sticks 6n and 6p joined to the back pad 67c protrude about 3 cm laterally from the side surface 5a. The side surface 5a and the back pad 67c are positioned approximately in parallel about 2 cm apart with each other.

The method of holding by a portable electronic terminal holding tool in this configuration is the same as described in FIG. 37 of the twelfth embodiment. That is, first, the forefinger 32 (all the fingers are not shown in the figure) is inserted passing by the side surface 5a from the direction of the front surface 2 (not shown in the figure) of a portable electronic terminal 1 to the direction of the back surface 4 until the fingertip of the forefinger touches the flat part 64i. Second, the middle finger 33 is inserted passing by the side surface 5a from the direction of the front surface 2 (not shown in the figure) thereof to the direction of the back surface 4 until the fingertip of the middle finger touches the flat part 64i on the back surface 4 so that the stick 6n can be placed between the forefinger 32 and the middle finger 33. Then, the ring finger 34 is inserted passing by the side surface 5a from the direction of the front surface 2 (not shown in the figure) thereof to the direction of the back surface 4 until the fingertip of the ring finger touches the flat part 64i on the back surface 4 so that the stick 6p can be placed between the middle finger 33 and the ring finger 34. By holding this way, the stick 6n is on the interdigit 38a between the forefinger 32 and the middle finger 34, and the stick 6p is on the interdigit 38b between the middle finger 33 and the ring finger 34, while the back pad 67c contacts the backs of the forefinger 32, the middle finger 33 and the ring finger 34.

Advantages of the holding in this holding state is the same as illustrated in the twelfth embodiment. That is, the forces applied to each finger reduces, and it allows to reduce the stress on the fingers and their fatigue due to holding.

Another advantage of this embodiment is that most of the components of the holding tool are made of one flat sheet. To make them is easy and the cost is inexpensive. By taking a large area for the viscous part 63k, the holding tool is firmly adhered to the portable electronic terminal 1, increasing the reliability of holding. In addition, another advantage is that the holding tool can be detached more easily than detaching something very rigid. This is because the flat part 64i is slightly bent upon detaching it, and when the flat part 64i is detached slowly from the back surface 4, the force of detaching is gradually applied from the edge of the viscous part 63k.

Note that the sticks 6n and 6p in this embodiment are originally a monolithic plate on which V-shaped grooves have been put. However, the "stick" of the present invention functions as the holding tool if it is at the most 1 cm wide for putting it on the interdigit, and the laterally protruding part is about 2 cm long for a finger to sandwich, and the stick has rigidity against bending allowing resisting the balanced force according to the principle of the leverage. The functionality of the stick does not depend on the shape of its cross-section, or on whether it is hollow, or on the connection state to the other parts.

Embodiment 14

Figure 39:
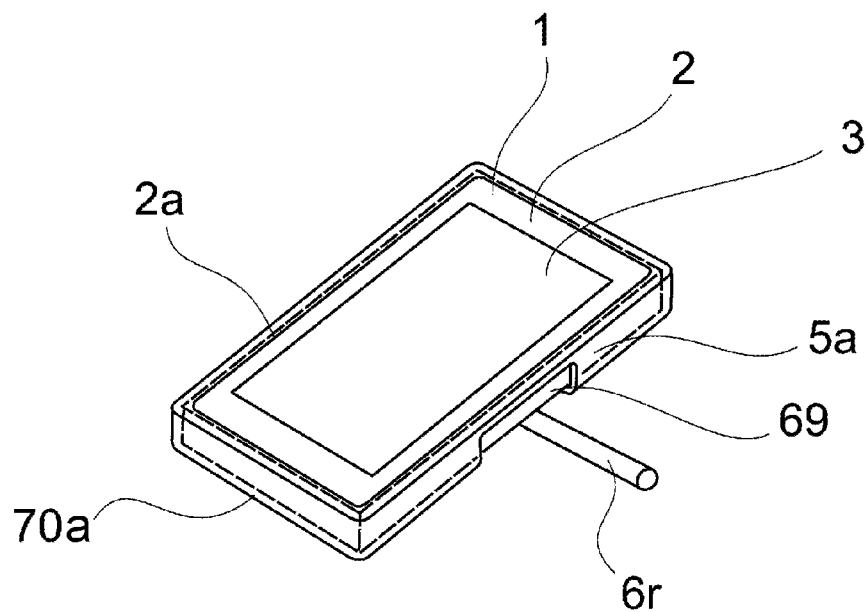
FIG. 39 is a perspective view of the front surface of the fourteenth embodiment of the present invention.
Figure 40:
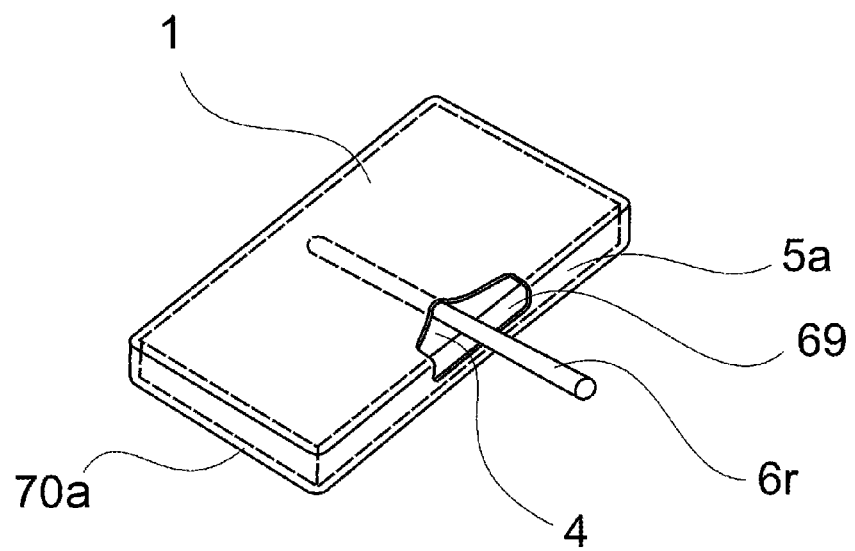
FIG. 40 is a perspective view of the back surface of the fourteenth embodiment of the present invention.

Referring to FIGS. 39 and 40, will be described the configuration of a portable electronic terminal holding tool of the fourteenth embodiment. FIG. 39 is a perspective view of the front surface of the fourteenth embodiment of the present invention. FIG. 40 is a perspective view of the back surface of the fourteenth embodiment thereof. The portable electronic terminal 1 is covered with an elastic cover 70a so as to cover the back surface 4, four side surfaces such as 5a, and the edges of the front surface 2. A part of the cover 70a covering the side surface 5a of the portable electronic terminal 1 has a cut-off part 69. That means the cut-off part 69 is not covered. One end of the stick 6r is passed through this cut-off part 69 and is inserted about 8 cm on the back surface 4 and between the cover 70a and the portable electronic terminal 1. The other end of the stick 6r protrudes about 4 cm laterally from the side surface 5a. The cover 70a normally fits closely to the back surface 4. However, it is possible to insert the stick 6r due to the elasticity of the cover 70a, and the stick 6r is firmly fixed between the back surface 4 and the cover 70a due to its shrinking force.

Upon the use of a portable electronic terminal 1, just same as in other embodiments, the stick 6r is placed on the interdigit between forefinger and middle finger, while the fingertips of the four fingers, the forefinger, the middle finger, the ring finger and the little finger, are placed on the outside of the cover 70a on the back surface 4. The part of the cover 70a on which the said fingertips are placed is pressed onto the back surface 4 of the portable electronic terminal 1. Since this part is close to the stick 6r, the force strengthen the fixation of the stick 6r.

If the cut-off part 69 is wide, it adds convenience because it widens the area where the stick 6r is inserted. Also, it is possible to change the position of the stick 6r within the width of the cut-off part 69 while the stick 6r is inserted, so that it expands the area for thumb to input on the display part 3.

Furthermore, the stick 6r needs not to be specific as a mere holding tool. Most of the ordinary writing tools of about 10 cm or more length are possibly used for the stick 6r.

Note that the cover 70a is required to remain covering a portable electronic terminal 1 even when it is pulled by force caused by inserting the stick 6r. Therefore, it is not enough for the cover 70a to cover the back surface 4 and the side surfaces. The cover 70a must be hooked to the portable electronic terminal 1 by reaching to the edges 2a of the front surface 2, or the cover 70a must cover the portable electronic terminal 1 tightly.

Embodiment 15

Since tablet-type portable electronic terminals can be carried anywhere and be held in one hand, they are used not only at a desk, but also used by those who lie on a sofa or a bed at home. When operating it lying on one's back, the back surface of a portable electronic terminal faces upward, i.e. to the sky, and the front surface faces downward, i.e. to the ground. In order to hold a portable electronic terminal in such posture, the front surface facing downward needs to be supported due to the gravity. However, the most part of the front surface except narrow peripheral part is normally a display part which also functions for input. Therefore, touching the display part may cause undesired input, thus, it is difficult to support the display part. It must be held with fingers put on the very narrow edges. That is, when a portable electronic terminal whose display part faces downward is held only in one hand with fingers on narrow edges thereof, it is very difficult to input by the fingers of the hand which hold the terminal. Although when the width of a small-sized portable electronic terminal is narrow about 7 cm, it may be held in a palm and four fingers except thumb and be operated by tapping with the thumb. However, most of the tablet-type portable electronic terminals except mobile phones are at least 10 cm wide, it is absolutely impossible to input while held in one hand.

Figure 41:
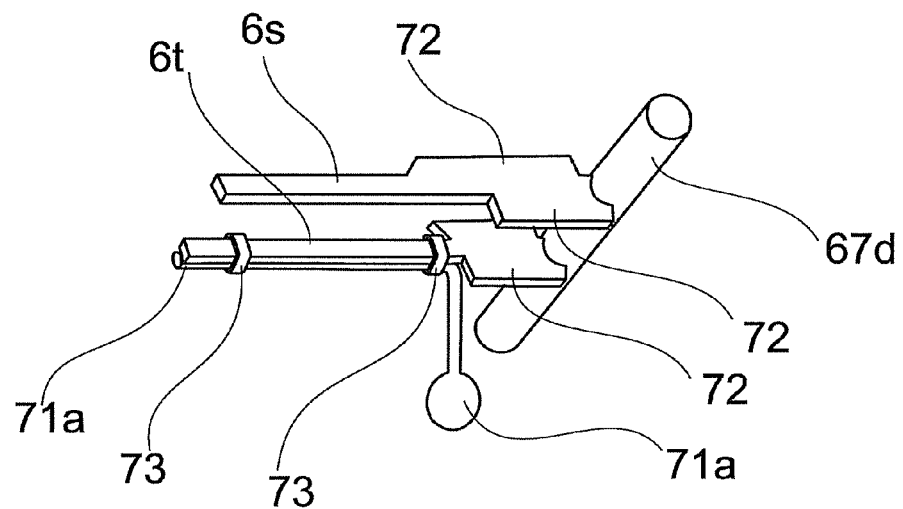
FIG. 41 is a perspective view of the fifteenth embodiment of the present invention.

Referring to FIGS. 41 to 44, will be described embodiments of the present invention with respect to the use when the front surface of a portable electronic terminal faces downward. FIG. 41 is a perspective view of the fifteenth embodiment of the present invention. The two sticks of high rigidity 6s and 6t are positioned in parallel with about 2 cm gap. One end of each of the two sticks 6s and 6t is joined to a highly rigid back pad 67d. The base parts where the two sticks 6s and 6t are joined to the back pad 67d are wide-width widened part 72. The stick 6t is accompanied with an L-shaped palm-contact part 71a tied to itself by two binding parts 73. The palm-contact part 71a is composed of the bound parts to the stick 6t, a bent part in a right angle to the bound parts, and a spherical part on its end.

Figure 42:
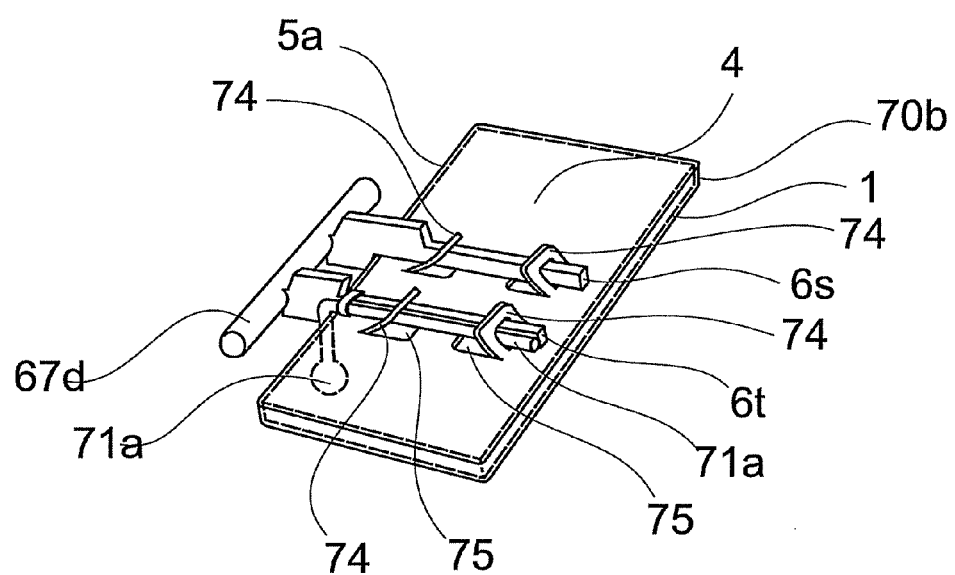
FIG. 42 is a perspective view of the back surface of the fifteenth embodiment of the present invention.

FIG. 42 shows a perspective view of the back surface of the fifteenth embodiment of the present invention. In FIG. 42, the holding tool in FIG. 41 is attached to a portable electronic terminal 1. The portable electronic terminal 1 is covered by a cover 70b covering the side surfaces such as 5a and the back surface 4. Two sticks 6s and 6t are attached to the back surface 4 thereof by being passed through four standing holes 74 of the cover 70b. The four standing holes 74 are made by cutting out the part of the cover 70b covering the back surface 4 thereof. The standing holes 74 are raised upright to fix the stick 6s and 6t for passing the sticks 6s and 6t through the standing holes 74. The standing holes 74 are stored in a storing cavity 75 so that they do not cause any inconvenience when a portable electronic terminal 1 is not used, that is, when the sticks 6s and 6t need not to be passed through the standing holes 74. The sticks 6s and 6t protrude laterally from the side surface 5a. The back pad 67d is in parallel by about 2 cm gap to the side surface 5a of the portable electronic terminal 1. The L-shaped palm-contact part 71a has a spherical part on the end which protrudes about 5 cm from the side surface 5a in the direction of the front surface 2 (not shown in FIG. 42).

Figure 43:
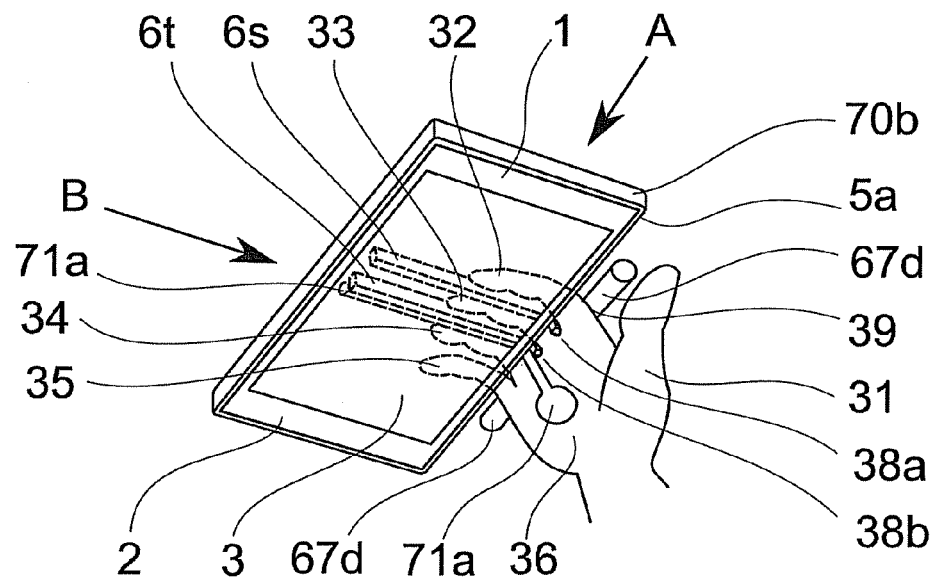
FIG. 43 is a perspective view of the front surface in use of the fifteenth embodiment of the present invention.

FIG. 43 is a perspective view of the front surface upon use of the fifteenth embodiment of the present invention. The common parts to the previous figures are indicated by the same reference numerals in FIG. 43. The holding tool is held as follows: First, forefinger 32 is inserted from the direction of the front surface 2 of a portable electronic terminal 1, passing by a side surface 5a until the fingertip of the forefinger 32 is placed on the back surface 4 through a cover 70b. Second, middle finger 33 is inserted from the direction of the front surface 2 thereof, passing by the side surface 5a until the fingertip of the middle finger 33 is placed on the back surface 4 through the cover 70b so that the stick 6s can be taken between the forefinger 32 and the middle finger 33. Then, ring finger 34 is inserted from the direction of the front surface 2 thereof, passing by the side surface 5a until the fingertip of the ring finger is placed on the back surface 4 through the cover 70b so that the stick 6t can be taken between the middle finger 33 and the ring finger 34. When the front surface 2 thereof faces downward (in the direction of the ground) in this way of holding, the back pad 67d contacts the backs of the fingers 39, and the spherical end of the palm-contact part 71a contacts a palm 36. In this state, the portable electronic terminal 1 is held securely without dropping from the hand.

Figure 44:
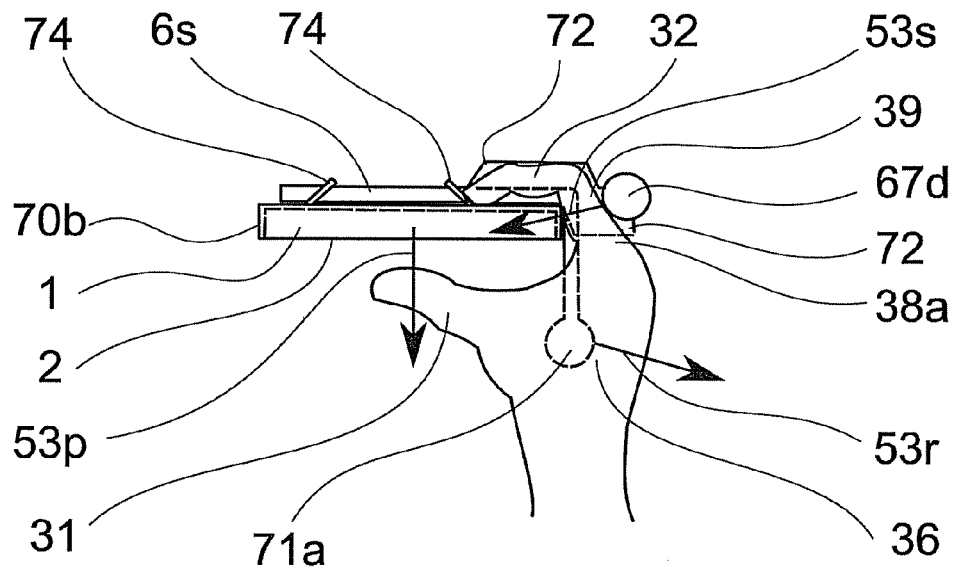
FIG. 44 is an arrow view of the fifteenth embodiment of the present invention.

Below is described the reason that a portable electronic terminal 1 does not drop from a holding hand. FIG. 44 is an arrow view of the fifteenth embodiment of the present invention. FIG. 44 is a view from the direction of an arrow A in FIG. 43. The common parts to the previous figures are indicated by the same reference numerals in FIG. 44. The portable electronic terminal 1 is inside a cover 70b with the front surface 2 facing downward. In this state, the weight of the portable electronic terminal 1 works on its gravity center, causing downward (toward the ground) vector force 53p. The force is transmitted from the portable electronic terminal 1 through the cover 70b to sticks 6s and 6t which pass through standing holes 74 and a palm-contact part 71a. The sticks 6s and 6t are joined to a back pad 67d which contacts the backs of the fingers 39. As its stress, the said vector force 53p causes a vector force 53s which presses the backs of the fingers 39. The highly rigid palm-contact part 71a is L-shaped and its spherical end contacts a palm 36. As its stress, the said vector force 53p causes vector force 53r which makes the spherical end of the palm-contact part 71a press the palm 36. In this situation, if the hand keeps the holding state statically to receive these vector forces, the forces balance, thus, it prevents the portable electronic terminal 1 from dropping from the hand.

That can be illustrated from a different viewpoint as follows. The vector force 53p which works in the direction of falling of the portable electronic terminal 1 becomes a counter-clockwise moment whose fulcrum (center) is a contact point of the backs of the fingers 39 to the back pad 67d. This moment is transmitted to the spherical end of the palm-contact part 71a and is received by the palm 36, so that the portable electronic terminal 1 fails to drop and stands still. In addition, from quite another viewpoint, the vector force 53p which works in the direction of falling of the portable electronic terminal 1 becomes a counter-clockwise moment whose fulcrum (center) is a contact point of the palm 36 to the spherical end of the palm-contact part 71a. The moment of force is transmitted to the back pad 67d, and received by the backs of the fingers 39, thus, the portable electronic terminal 1 fails to drop and remains still. The portable electronic terminal 1 does not drop from a hand due to the interaction of the above-mentioned stress.

Also, in this stress interaction, no stress related to holding is applied to the fingertips of forefinger 32, middle finger 33, ring finger 34, and little finger 35, so that if these fingertips are off from the back surface 4 (through the surface cover 70b), the portable electronic terminal 1 does not drop from the hand.

Note that even one stick can also support a portable electronic terminal 1, though the present embodiment provides two sticks 6s and 6t protruding laterally from the side surface. It is also true of the case where three sticks are employed. In short, the main function of a stick/sticks protruding laterally from the side surface is keeping a back pad 67d and the side surface 5a in parallel with a certain distance between them. Only with this function, the portable electronic terminal 1 does not drop from a hand. Also, the relationship between a stick/sticks and fingers, there is no condition of which stick and which finger must be adjacent. For example, when two sticks are provided just as this embodiment and the distance between the two sticks is wide enough that all the four fingers, forefinger 32, middle finger 33, ring finger 34, and little finger 35, are inserted between the two sticks and the all the backs of the four fingers 39 support a back pad 67d, the portable electronic terminal 1 also can be held without dropping from a hand.

In this holding state, no force related to holding is applied to thumb 31. Since the spherical end of palm-contact part 71a contacts to the center of a palm 36, no force is applied to the thenar of the thumb 31. That means the thumb 31 is free to move, and can tap a display part 3 (not shown in the figure) freely on the front surface 2 of the portable electronic terminal 1. That is, the portable electronic terminal 1 facing downward is held by one hand and can be provided with input by the same hand.

Furthermore, in the present embodiment, the sticks 6s and 6t provide additional function other than fixing a back pad 67d. In the present embodiment, the widened parts 72 of the sticks 6s and 6t contact the interdigit 38a between forefinger 32 and middle finger 33, and the interdigit 38b between the middle finger 33 and ring finger 34. This contact prevents the back pad 67d which contact the backs of the fingers 39 from being off from favorable position, so that it can be held more securely. Especially, when the posture of the hand is changed to a large extent in order for the thumb 31 to reach a very far part, the fingers such as forefinger 32 and middle finger 33, and so on whose fingertips are placed on the back surface 4 of the portable electronic terminal 1 are tilted. Thus, it may lead to sliding or a less secure hold. In the present embodiment, the widened parts 72 contacts the sides of those fingers and stops sliding off, thus, the hold is secured.

It is possible in the present embodiment to provide input by thumb of a hand which holds a portable electronic terminal facing downward. However, when an attempt is made to input by thumb to a wide range, the spherical end of a palm-contact part 71a must be placed on a palm 36 all the time, so that it limits the range of input. However, there is a way to extend the input range by thumb 31. It will be described in the following.

Figure 45:
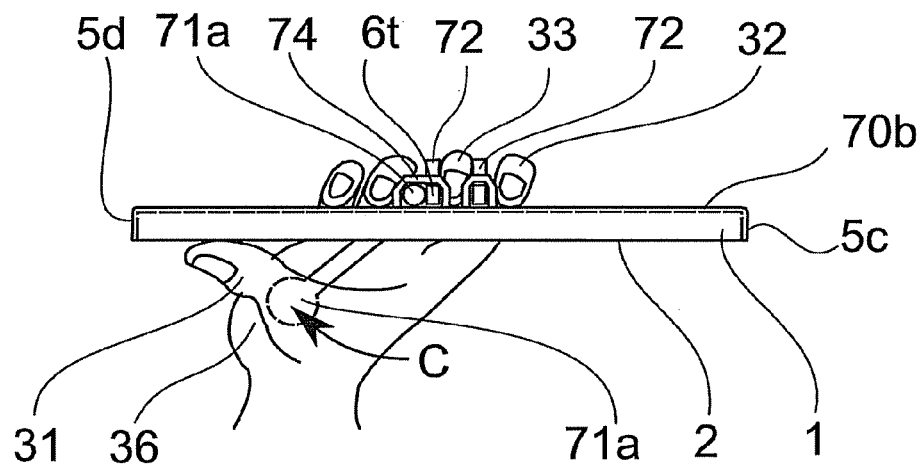
FIG. 45 is a second arrow view of the fifteenth embodiment of the present invention.

FIG. 45 is a different arrow view of the present fifteenth embodiment of the present invention. It is a view seen from the direction of an arrow B in FIG. 43. The common parts to previous figures are indicated by the same reference numerals in FIG. 45. When input is needed on the lower end of a display part 3 (not shown in FIG. 45), which is close to the side surface 5d, the fingertip of thumb 31 does not reach the lower end of the front surface 2 because the spherical part of a palm-contact part 71a protrudes vertically and restricts free move of the thumb 31. In this embodiment as is illustrated in FIG. 45, palm-contact part 71a bound by binding parts 73 (hidden behind standing holes 74 in FIG. 45) where the stick 6t contacts rotates in the binding parts 73. With this rotation, the spherical end of the palm-contact part 71a turns in a circular orbit on a plane space which is vertical to the front surface 2 and includes the side surface 5a. As the spherical end of the palm-contact part 71a turns round clockwise in a circular orbit in the direction of the side surface 5d as illustrated by an arrow C, the palm 36 can be moved with it, so that the fingertip of the thumb 31 reaches the lower end of the front surface 2, enabling the thumb 31 to provide input there without dropping of the portable electronic terminal 1.

Figure 46:
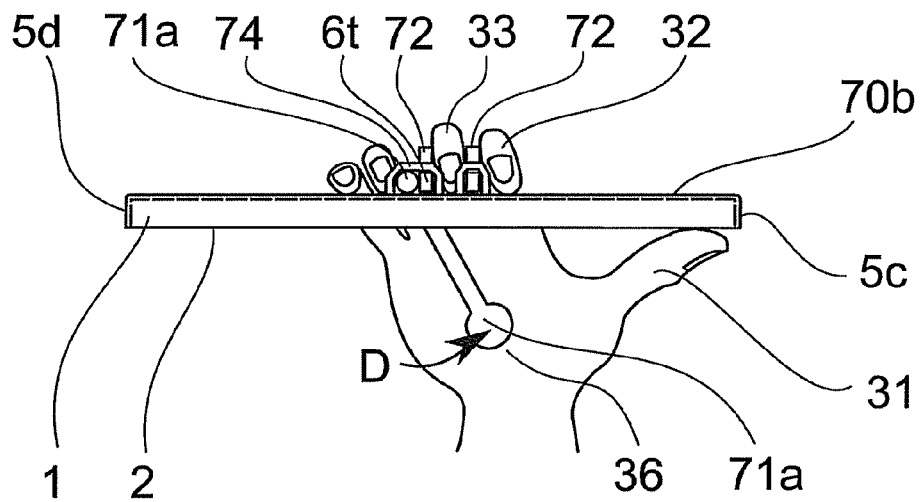
FIG. 46 is a third arrow view of the fifteenth embodiment of the present invention.

Similarly, when an input is needed to the opposite end, namely the upper end of the display part 3 (not shown in FIG. 45), the thumb 31 tries to reach the upper end of the front surface 2. But, as the spherical end of the palm-contact part 71a stands vertically to the front surface 2. Then, the spherical end of the palm-contact part 71a is off from the palm 36, resulting in a drop of the portable electronic terminal 1. FIG. 46 is another arrow view of the fifteenth embodiment of the present invention. Just as FIG. 45, it is a view seen from the direction of an arrow B in FIG. 43. The common parts to the previous figures are indicated by the same reference numerals in FIG. 46. Similarly to the previous explanation, the palm-contact part 71 bound by the binding parts 73 (hidden behind standing holes 74 in FIG. 46) where the stick 6t contacts rotates in the binding parts 73. With the rotation, the spherical end of the palm-contact part 71a turns counter-clockwise in a circular orbit in the direction of the side surface 5c as an arrow D illustrates. This allows the fingertip of the thumb 31 to reach the upper end of the front surface 2 near the side surface 5c, because the palm 36 moves along with palm-contact pad 71a. Thus, it becomes possible to provide input without dropping of the portable electronic terminal 1. In short, rotation of the spherical end of the palm-contact part 71a allows input in a wide range by thumb 31.

Note that it is preferable that the rotating part should have appropriate static friction force by adjusting binding force at the binding parts 73 because easy rotation causes insecure support by a palm 36.

Although this embodiment takes the method of rotation by using an L-shaped rigid body as a palm-contact part 71a, the palm-contact part 71a is not limited to an L-shape. The requirement of the palm-contact part 71a is a fixation and protruding from the side surface 5a in the direction of the front surface 2. Also, the method for rotation is not limited to rotating the L-shaped rigid body.

Note that in case described in FIG. 46, as the shape of a holding hand is greatly changed in order that the thumb 31 reaches far part, the fingers such as forefinger 32 and middle finger 33 and so on whose fingertips contact the back surface 4 of a portable electronic terminal 1 are tilted on the back surface 4. That may lead to a slip thereof and an insecure hold of a portable electronic terminal 1. However, the present embodiment provides widened parts 72 on the ends of the sticks 6s and 6t, the widened parts 72 contact the side surfaces of the fingers and stop dropping, thus, ensures the hold thereof.

The widened parts 72 are also useful when a portable electronic terminal 1 is held slanted. When slanting a portable electronic terminal 1, the positions of fingers holding the portable electronic terminal 1 are gradually off from the hand due to the stress caused by the weight thereof. The widened parts 72 can stop such change of the fingers' positions due to the contact to the side surfaces of the fingers. As a result, the portable electronic terminal 1 is securely held even in a slanted position.

Embodiment 16

Figures 47, 48:
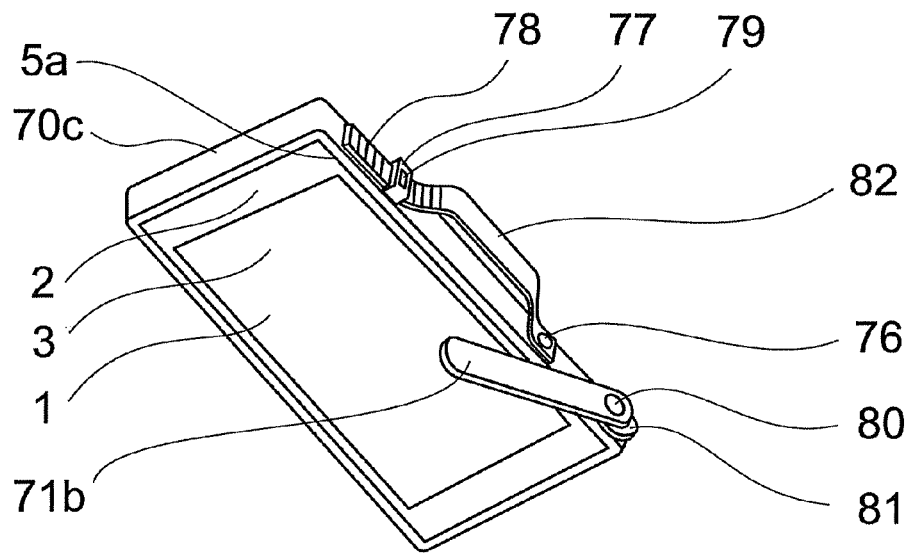
FIG. 47 is a perspective view of the front surface of the sixteenth embodiment of the present invention.
FIG. 48 is a perspective view of the front surface in use of the sixteenth embodiment of the present invention

FIG. 47 is a perspective view of the front surface of the sixteenth embodiment of the present invention. This embodiment employs a cover 70c of 1 mm thickness on average which cover the back surface 4 (not shown in FIG. 47) and the side surfaces of a portable electronic terminal 1 so that the portable electronic terminal 1 can be inside the cover 70c. A hand belt 82 is attached to the cover 70c which covers the side surface 5a thereof. The hand belt 82 is fixed at both ends of it with a clasp 76 and a buckle 77, so that it is indirectly connected to the side surface 5a. The length of the hand belt 82 is adjustable by changing the length of inserted part to the buckle 77 according to the size of a holding finger/fingers of the portable electronic terminal 1. For that purpose, a plurality of notches 78 are provided and it is possible to fix with a button 79 at a desired point. When not in use of the portable electronic terminal 1, one end of the hand belt 82 is pulled into the buckle 77 to the maximum so that the hand belt is placed closely on the side surface 5a. This prevents inconvenience in carrying.

A palm-contact part 71b of high rigidity is attached to the end of the cover 70c on the side surface 5a with an axis 80 via a spacer 81. This palm-contact part 71b is rotatable with the axis 80 upon a certain force or more being applied. The center of the rotating orbit of the end of the palm-contact part 71b on the side surface 5a. The palm-contact part 71b is almost vertical to the front surface 2, and it turns in a circle on the plane including the side surface 5a. Upon use, it is used protruding in the direction of the front surface 2 as described in FIG. 47. When not in use, it is turned to be stored closely on the side surface 5a without taking much space. The axis 80 is designed to have appropriate friction to prevent from turning easily any time and to allow turning by force of a certain strength or more. The spacer 81 has friction between itself and the palm-contact part 71b so that the palm-contact part 71b does not turn by a little force.

FIG. 48 is a perspective view of the front surface during the use of the sixteenth embodiment of the present invention. The portable electronic terminal is held as follows. First, the front surface 2 thereof faces downward (to the ground) and forefinger 32 is placed from the direction of the front surface 2, along a side surface 5a. Then, middle finger 33, ring finger 34 and little finger 35 are inserted from the direction of the front surface 2 into the space between a hand belt 82 and the side surface 5a. Holding this way, the hand belt 82 contacts the backs of the middle finger 33, the ring finger 34 and the little finger 35, while the end of a palm-contact part 71b contacts a palm 36. In this state, the portable electronic terminal is held securely without dropping from a hand. The distance between the part of the hand belt 82 which contacts the backs of the fingers 39 and the surface of a cover 70c covering the side surface 5a is about 2 cm. The reason that the portable electronic terminal 1 does not drop is the same as illustrated in the fifteenth embodiment. That is, the stress working in the direction of falling of the portable electronic terminal 1 caused by the weight thereof is transmitted to the end of the palm-contact part 71b and the hand belt 82 as rotating moment. Each force is received by a palm 36 and the back of fingers 39, and the forces balances. It results in prevention of the portable electronic terminal 1 from dropping. Under the state of such secure holding, the thumb 31 moves freely because the thumb 31 including its thenar does not receive the stress of holding. Therefore, it is possible for thumb 31 to provide input in a wide range on a display part 3 of the front surface 2.

Note that fingertips of forefinger 32, middle finger 33, ring finger 34, and little finger 35 can be either placed on (the cover 70c of) the back surface 4 or not. The portable electronic terminal 1 is held by the backs of the fingers 39 and the palm 36. However, it provides more stable hold when the fingertips are placed on the back surface 4.

Also, when the portable electronic terminal 1 is held in a slant position, the positions of the fingers are gradually off to the side due to the stress of the weight thereof. Since in this embodiment, part of the hand belt 82 is placed between the forefinger 32 and the middle finger 33, the hand belt 82 stops such slides by contacting and stopping the side surface of the fingers. Thus, it allows a secure hold of the portable electronic terminal 1 even in a slant position. In addition, when the interdigit 38a between the forefinger 32 and the middle finger 33 touches the hand belt 82, it receives part of the stress related to dropping, to ensure the holding.

Also, when a portable electronic terminal 1 is held just as described in this embodiment, the back of forefinger 32 does not touch the hand belt 82. Thus, it does not receive any stress. This allows moving the forefinger 32 freely, in addition to the thumb 31 having high flexibility. The forefinger 32 in this state can touch not only the back surface 4 thereof, but also reaches the front surface 2 to tap the display part 3 thereon. Since two fingers, thumb 31 and forefinger 32, can be used for input on the display part 3. It is possible to enter more complicated input, such as pinch-in, i.e. movement of pinching with two fingers for zoom-out, or pinch-out, i.e. movement of widening of two fingers distance for zoom-in.

Note that the position of the forefinger 32 is not limited to this embodiment. If the hand belt 82 is long enough, another way of holding is possible. That is, the forefinger 32 with other fingers, the middle finger 33, the ring finger 34, and the little finger 35 can be inserted into the space between the hand belt 82 and the side surface 5a from the direction of the front surface 2, and the fingertips of the four fingers are placed on the back surface of the cover 70c to hold the portable electronic terminal 1. In such a case, if the end of the hand belt 82 is pulled into a buckle 77 and a notch 78 is fixed with a button 79 for the fingers fitting for the above-mentioned space, the four fingers are fixed so that they can hold the portable electronic terminal 1 stably because the hand belt 82 is made of a material of little elasticity. Also, even if the portable electronic terminal 1 is held in a slant position, the fingers are not off from the side.

Further, in the present embodiment, the palm-contact part 71b is fixed at the end of the cover 70c on the side surface 5a, however, it is not limited to that position. As long as the end thereof is set to contact a palm 36, it is possible to fix it at any position on the side surface 5a. It is also possible to set it at any point on the side between the both ends of the hand belt 82.

As described above, the present invention allows a flat-type portable electronic terminal beyond a certain size to be held in one hand without using its thumb by a simple mechanism. Enhancing the flexibility of thumb facilitates easy input operation. Moreover, not only in the case of holding the front surface facing upward, but also of holding it facing downward, adding another simple mechanism allows holding only in one hand without using its thumb, and facilitates easy input operation by the thumb.

INDUSTRIAL APPLICABILITY

The present invention of a portable electronic terminal holding tool is useful to ensure the holding thereof in a simple method as well as to increase the flexibility of thumb and increases its reachable range which improves the input operability by thumb.

LIST OF REFERENCE NUMERALS

1: portable electronic terminal
2: front surface
3: display part
4: back surface
5a, 5b, 5c, 5d: side surface
6 with subscript 'a' to 'k', 'm', 'n', 'p', 'r' to 't': stick
7: storage space
8 with subscript 'a' to 'i': pinching part
9: nib
10 with subscript 'a' to 'i': hook
11 with subscript 'a' to 'i': receiving part
12a, 12b: slit
13: board
14c, 14d, 14e, 14f: bottom
21: ring
22: base
23: ring tray
24: hole
30: hand
31: thumb
32: forefinger
33: middle finger
34: ring finger
35: little finger
36: palm
38a, 38b, 38c: interdigit (i.e. part of the hand lying between any two adjacent fingers)
39: backs of fingers
40: controller
41: operation button
42: cord
43: handle
50a, 50b, 50c: fulcrum
51a, 51b, 51c: point of effort
52a, 52b, 52c: point of load
53 with subscript 'a' to 'k', 'p', 'r', 's': vector force
54: inner surface of finger
55: first knuckle joint
56: second knuckle joint
57: third knuckle joint
60: magnet
61: sheet iron
62: through-hole
63 with subscript 'a' to 'k': viscous part
64 with subscript 'a' to 'i': flat part
65 with subscripts 'a' to 'd': stick-supporting part
66: cover sheet
67a, 67b, 67c, 67d: back pad
68a, 68b: pressed groove
69: cut-off part
70a, 70b, 70c: cover
71a, 71b: palm-contact part
72: widened part
73: binding part
74: standing hole
75: storing cavity
76: clasp
77: buckle
78: notch
79: button
80: axis
81: spacer
82: hand belt
END

The invention claimed is:

1. A holding tool for a roughly rectangular and flat shaped portable electronic terminal,
wherein said portable electronic terminal has front surface which has display part which also functions as input part whose input is provided by tapping it by fingers, back surface which is opposite to said front surface, and at least one side surface between said front surface and said back surface,
comprising:
a stick having a longitudinal axis, one end of said stick protrudes from said at least one side surface laterally and is secured to constrain rotational motion perpendicular to the longitudinal axis of the stick in at least two degrees of freedom;
wherein the stick defines a means for holding said portable electronic terminal by placing said stick on the interdigit between fingers except thumb from the direction of said front surface, by putting the fingertips of said fingers except thumb on said back surface, by using the principle of the leverage considering said fingertips of said fingers as fulcrum and considering said interdigit between said fingers except thumb as point of load and thereby permitting inputting by tapping said display part by said thumb; and further comprising:
two flat parts which adhered to said back surface of said portable electronic terminal;
stick-supporting part which is between said flat parts and connected to said flat parts;
and said stick which is detachably fixed to said back surface by said stick-supporting part.

2. The portable electronic terminal holding tool as described in claim 1,
wherein said stick is input stylus or writing tool.

3. A portable electronic terminal comprising the portable electronic terminal holding tool as described in claim 1.

4. The portable electronic terminal holding tool as described in claim 1,
comprising:
two parallel said sticks disposed in spaced relation permitting each of said sticks to be placed on each interdigit between fingers except thumb.

5. A method for holding a roughly rectangular and flat shaped portable electronic terminal,
wherein said portable electronic terminal has front surface which has display part which also functions as input part whose input is provided by tapping it by fingers, back surface which is opposite to said front surface, and at least one side surface between said front surface and said back surface,
comprising:
a stick, one end of said stick protrudes from said at least one side surface laterally;
holding said portable electronic terminal by placing said stick on the interdigit between fingers except thumb from the direction of said front surface, by putting the fingertips of said fingers except thumb on said back surface, by using the principle of the leverage considering said fingertips of said fingers as fulcrum and considering said interdigit between said fingers except thumb as point of load;
inputting by tapping said display part by said thumb;
wherein allowing to input on wide area by thumb at the time of use,
and enabling said stick to be stored in said portable electronic terminal, detached, or folded up at the time of non-use.

6. A holding tool for a roughly rectangular and flat shaped portable electronic terminal,
wherein said portable electronic terminal has front surface which has display part which also functions as input part whose input is provided by tapping it by fingers, back surface which is opposite to said front surface, and at least one side surface between said front surface and said back surface,
comprising:
a stick, one end of said stick protrudes from said at least one side surface laterally;
a back pad which is joined to said stick and roughly parallel to said at least one side surface and positioned to touch the backs of the fingers of hand which holds said portable electronic terminal when in use;
wherein the stick defines a means for holding said portable electronic terminal by putting the fingertips of said fingers except thumb on said back surface, by letting said backs of said fingers except thumb contact said back pad and thereby permitting inputting by tapping said display part by said thumb.

7. The portable electronic terminal holding tool as described in claim 6, wherein said stick is disposed relative to the portable electronic terminal to enable placement during use on an interdigit between fingers except thumb.

8. The portable electronic terminal holding tool as described in claim 6, wherein said stick and said back pad forms monolithic structure.

9. A method for holding a roughly rectangular and flat shaped portable electronic terminal,
wherein said portable electronic terminal has front surface which has display part which also functions as input part whose input is provided by tapping it by fingers, back surface which is opposite to said front surface, and at least one side surface between said front surface and said back surface,
comprising:
a stick, one end of said stick protrudes from said at least one side surface laterally;
a back pad which is joined to said stick and roughly parallel to said at least one side surface;
holding said portable electronic terminal by putting the fingertips of said fingers except thumb on said back surface and by letting backs of said fingers except thumb contacting said back pad;
inputting by tapping said display part by said thumb.

10. A holding tool for a roughly rectangular and flat shaped portable electronic terminal,
wherein said portable electronic terminal has front surface which has display part which also functions as input part whose input is provided by tapping it by fingers, back surface which is opposite to said front surface, and at least one side surface between said front surface and said back surface,
comprising:
a stick, one end of said stick protrudes from said at least one side surface laterally;
a back pad which is joined to said stick and roughly parallel to said at least one side surface and positioned to touch the backs of the fingers of a hand which holds said portable electronic terminal when in use;
a palm-contact part which protrudes in the direction of said front surface from said at least one side surface;
wherein said palm-contact part defines a means for touching the palm of hand which holds said portable electronic terminal at the time of holding said portable electronic terminal facing downward.

11. The portable electronic terminal holding tool as described in claim 10,
wherein said stick is disposed relative to the portable electronic terminal to enable placement during use on an interdigit between fingers except thumb.

12. The portable electronic terminal holding tool as described in claim 10, wherein the end of said palm-contact part rotates in a plane which is vertical to said front surface.

13. A method for holding a roughly rectangular and flat shaped portable electronic terminal, wherein said portable electronic terminal has front surface which has display part which also functions as input part whose input is provided by tapping it by fingers, back surface which is opposite to said front surface, and at least one side surface between said front surface and said back surface, comprising:
- a stick, one end of said stick protrudes from said at least one side surface laterally;
- a back pad which is joined to said stick and roughly parallel to said at least one side surface;
- a palm-contact part which protrudes to the direction of said front surface from said at least one side surface,
- holding said portable electronic terminal facing downward;
- having said back pad contact to backs of fingers except thumb;
- having said palm-contact part contact to palm of holding hand.

14. A holding tool for a roughly rectangular and flat shaped portable electronic terminal, wherein said portable electronic terminal has front surface which has display part which also functions as input part whose input is provided by tapping it by fingers, back surface which is opposite to said front surface, and at least one side surface between said front surface and said back surface, comprising:
- a hand belt connected to said at least one side surface and which contacts to the backs of fingers of holding hand when in use;
- a palm-contact part protruded from said at least one side surface to the direction of said front surface and disposed to contact the palm of holding hand at the time of holding said portable electronic terminal facing downward.

15. A method for holding a roughly rectangular and flat shaped portable electronic terminal, wherein said portable electronic terminal has front surface which has display part which also functions as input part whose input is provided by tapping it by fingers, back surface which is opposite to said front surface, and at least one side surface between said front surface and said back surface, comprising:
- a hand belt connected to said at least one side surface and which contacts to the backs of fingers of holding hand;
- a palm-contact part protruded from said at least one side surface to the direction of said front surface which contacts to palm of holding hand at the time of holding said portable electronic terminal facing downward.

* * * * *